United States Patent
Endo et al.

(10) Patent No.: US 11,093,537 B2
(45) Date of Patent: Aug. 17, 2021

(54) INFORMATION PROCESSING METHOD, INFORMATION PROCESSING APPARATUS, AND NON-TRANSITORY RECORDING MEDIUM

(71) Applicant: Panasonic Intellectual Property Management Co., Ltd., Osaka (JP)

(72) Inventors: Mitsuru Endo, Tokyo (JP); Katsuyoshi Yamagami, Osaka (JP); Takashi Ushio, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 286 days.

(21) Appl. No.: 15/805,915

(22) Filed: Nov. 7, 2017

(65) Prior Publication Data
US 2018/0150553 A1  May 31, 2018

(30) Foreign Application Priority Data

Nov. 25, 2016 (JP) .............................. JP2016-229559
Jul. 24, 2017 (JP) .............................. JP2017-142412

(51) Int. Cl.
*G06F 16/33* (2019.01)
*G06F 16/9032* (2019.01)
*G06F 16/735* (2019.01)

(52) U.S. Cl.
CPC ........ *G06F 16/3344* (2019.01); *G06F 16/735* (2019.01); *G06F 16/90332* (2019.01)

(58) Field of Classification Search
CPC ........... G06F 16/3344; G06F 16/90332; G06F 16/735; G06F 16/334
See application file for complete search history.

(56) References Cited

U.S. PATENT DOCUMENTS

| | | | |
|---|---|---|---|
| 2011/0213642 A1* | 9/2011 | Makar | G06F 17/2785 705/7.38 |
| 2014/0129258 A1* | 5/2014 | Charlot | G16H 10/60 705/3 |

(Continued)

FOREIGN PATENT DOCUMENTS

| | | |
|---|---|---|
| JP | 2003-108581 | 4/2003 |
| JP | 2010-224608 | 10/2010 |

(Continued)

OTHER PUBLICATIONS

Norihito Yasuda et al., "Mixed-initiative dialogue control using two types of recognition grammer", Information Processing Society of Japan, 2002.10, Feb. 2, 2002 (English Abstract).

(Continued)

*Primary Examiner* — Hosain T Alam
*Assistant Examiner* — Anthony G Gemignani
(74) *Attorney, Agent, or Firm* — Greenblum & Bernstein, P.L.C.

(57) ABSTRACT

There is provided an information processing method for performing, through interaction with a user, narrowing down regarding information that the user desires to search for. The method includes: outputting a first question, which is an open question, about a target of search; obtaining a first answer to the first question, the first answer being input by the user; if a determination is made indicating that the first answer does not satisfy a first condition and that a word or phrase corresponding to a word or phrase included in the first answer is not included in a database, outputting a second question, which is an open question, for requesting an explanation about the word or phrase included in the first answer and not included in the database; and if a determination is made indicating that the first answer satisfies the (Continued)

first condition, outputting a closed question about the target of search.

19 Claims, 22 Drawing Sheets

(56) References Cited

U.S. PATENT DOCUMENTS

| | | | |
|---|---|---|---|
| 2014/0164508 A1* | 6/2014 | Lynch | H04L 29/08081 709/204 |
| 2016/0203500 A1* | 7/2016 | Williams | G06Q 30/0203 705/7.32 |
| 2018/0039633 A1 | 2/2018 | Miyoshi et al. | |

FOREIGN PATENT DOCUMENTS

| | | |
|---|---|---|
| JP | 2011-076360 A | 4/2011 |
| WO | 2016/135905 A1 | 9/2016 |

OTHER PUBLICATIONS

The Extended European Search Report dated Feb. 6, 2018 for the related European Patent Application No. 17200953.2.

* cited by examiner

| TYPE OF QUESTION | CONDITION | |
|---|---|---|
| OPEN QUESTION | FIRST | WHAT IS THE PROBLEM TODAY? |
| | SECOND OR LATER | ANY OTHER SYMPTOMS? |
| CLOSED QUESTION | * | DO YOU HAVE SYMPTOM X? |

| TYPE OF QUESTION | CONDITION | |
|---|---|---|
| OPEN QUESTION | FIRST | WHAT KIND OF RECIPE ARE YOU LOOKING FOR? |
| | SECOND OR LATER | ANY OTHER CONDITIONS? |
| CLOSED QUESTION | RELATION: *IsA node 2 | WOULD YOU LIKE node 2? |
| | RELATION: *HasA node 2 | DO YOU USE node 2? |

| TYPE OF QUESTION | CONDITION | |
|---|---|---|
| OPEN QUESTION | FIRST | WHAT KIND OF TRAVEL PLAN ARE YOU LOOKING FOR? |
| | SECOND OR LATER | ANY OTHER CONDITIONS? |
| CLOSED QUESTION | * | WOULD YOU LIKE CONDITION X? |

| TYPE OF QUESTION | CONDITION | |
|---|---|---|
| OPEN QUESTION | FIRST | WHAT KIND OF PROPERTY ARE YOU LOOKING FOR? |
| | SECOND OR LATER | ANY OTHER CONDITIONS? |
| CLOSED QUESTION | * | DO YOU PREFER CONDITION X? |

| TYPE OF QUESTION | CONDITION | |
|---|---|---|
| OPEN QUESTION | FIRST | WHAT KIND OF PROGRAM ARE YOU LOOKING FOR? |
| | SECOND OR LATER | ANY OTHER CONDITIONS? |
| CLOSED QUESTION | * | WOULD YOU LIKE CONDITION X? |

| TYPE OF QUESTION | CONDITION | |
|---|---|---|
| OPEN QUESTION | FIRST | WHAT KIND OF RECIPE ARE YOU LOOKING FOR? |
| | SECOND OR LATER | ANY OTHER CONDITIONS? |
| CLOSED QUESTION | RELATION: *IsA node 2 | WOULD YOU LIKE node 2? |
| | RELATION: *PartOf node 2 | DO YOU USE node 2? |
| KNOWLEDGE ACQUISITION QUESTION | * | COULD YOU GIVE AN EXAMPLE? |

FIG. 22A

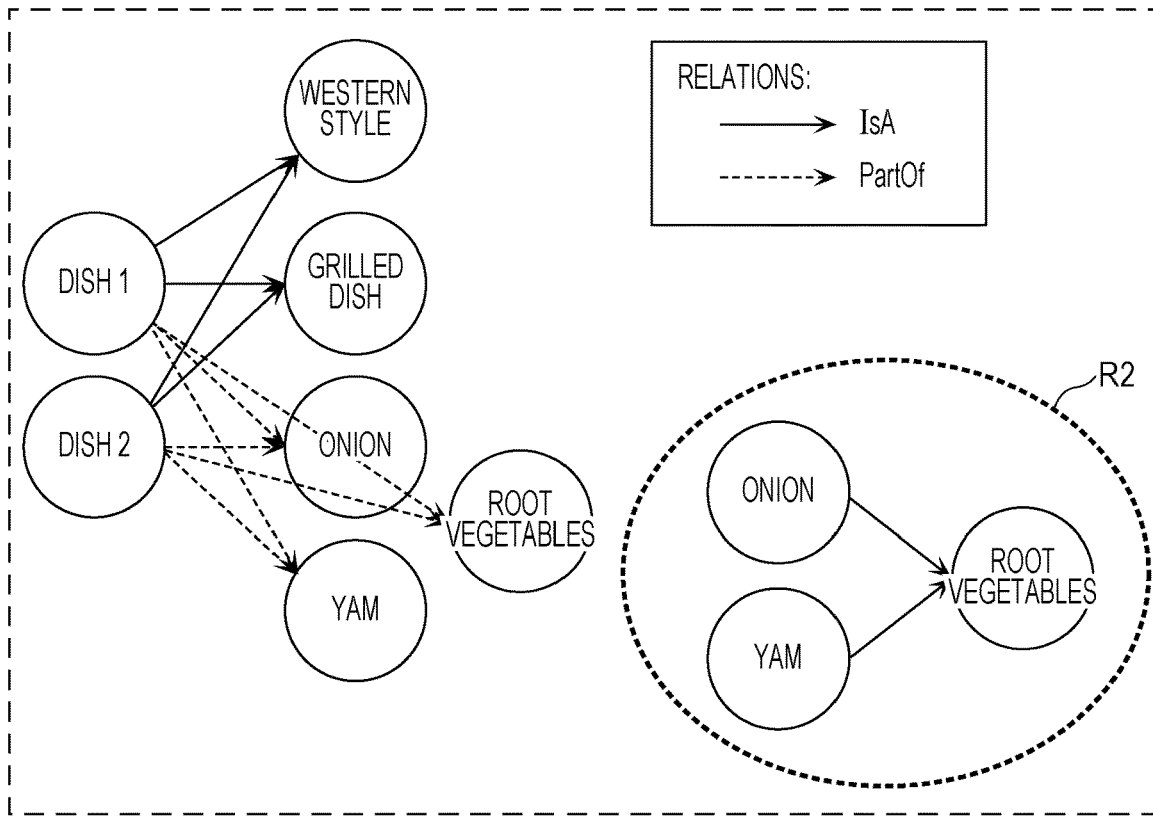

FIG. 22B

| TYPE OF QUESTION/<br>TYPE OF ANSWER | CONDITION | |
|---|---|---|
| OPEN QUESTION | FIRST | WHAT KIND OF RECIPE ARE YOU LOOKING FOR? |
| | SECOND OR LATER | ANY OTHER CONDITIONS? |
| CLOSED QUESTION | CONFIRMATION ABOUT "X"<br>RELATION: *IsA "X" | WOULD YOU LIKE "X"? |
| | CONFIRMATION ABOUT "X"<br>RELATION: *PartOf "X" | DO YOU USE "X"? |
| KNOWLEDGE ACQUISITION QUESTION | * | COULD YOU GIVE AN EXAMPLE? |
| ANSWER | WHAT QUESTION ABOUT "X"<br>RELATION: "Y" IsA "X" | FOR EXAMPLE, list_up ("Y"). |
| | WHAT QUESTION ABOUT "X"<br>RELATION: "X" IsA "Z" | IT IS A KIND OF "Z". |

INFORMATION PROCESSING METHOD, INFORMATION PROCESSING APPARATUS, AND NON-TRANSITORY RECORDING MEDIUM

BACKGROUND

1. Technical Field

The present disclosure relates to an information processing method, an information processing apparatus, and a non-transitory recording medium. Specifically, the present disclosure relates to an information processing method, an information processing apparatus, and a non-transitory recording medium that are for performing information processing by interacting with a user.

2. Description of the Related Art

There is a system for specifying necessary information through interaction between a user and an apparatus such as a computer. In this system, the concept of "initiative in interaction" is introduced, and interaction is controlled under the initiative of the system or user. For example, in a system employing system-led interaction control, the system takes the initiative in a flow and content of interaction. On the other hand, in a system employing user-led interaction control, the user takes the initiative in a flow and content of interaction.

When interaction control is led only by a system, a user is restricted from freely speaking and thus user satisfaction decreases. On the other hand, when interaction control is led only by a user, the user is allowed to freely speak and thus the system may be unable to follow an unexpected flow of interaction, causing a collapse of interaction. Accordingly, the system may be unable to specify necessary information and achieve a task, resulting in a decrease in user satisfaction.

Japanese Unexamined Patent Application Publication No. 2003-108581 discloses a technique for using user-led interaction control and system-led interaction control by switching therebetween. According to the technique disclosed in this publication, user-led interaction control is performed first, and the interaction control is switched to system-led interaction control if the time until the user responds is long, so that smooth interaction control can be performed.

SUMMARY

However, in the technique disclosed in the foregoing publication, the system may be unable to follow an unexpected flow of interaction during user-led interaction control, causing a collapse of interaction. In this case, it is impossible to obtain all conditions about information that the user desires to search for.

In one general aspect, the techniques disclosed here feature an information processing method for performing, through interaction with a user, narrowing down regarding information that the user desires to search for, the information processing method being executed by a computer and including: causing an output processor to output a first question, which is a first-type question, about a target of search, the first-type question being an open question; causing an input processor to obtain a first answer to the first question, the first answer being input by the user; if a determination is made indicating that the first answer does not satisfy a first condition and that, based on a database storing information about the target of search, a word or phrase corresponding to a word or phrase included in the first answer is not included in the database, causing the output processor to output a second question, which is the first-type question, for requesting an explanation about the word or phrase included in the first answer and not included in the database; if a determination is made indicating that the first answer does not satisfy the first condition and that, based on the database, the word or phrase corresponding to the word or phrase included in the first answer is included in the database, causing the output processor to output a third question, which is the first-type question, about the target of search; and if a determination is made indicating that the first answer satisfies the first condition, causing the output processor to output a fourth question, which is a second-type question, about the target of search, the second-type question being a closed question.

These general and specific aspects may be implemented using a system, a method, and a computer program, and any combination of systems, methods, and computer programs.

According to the information processing method and so forth of an embodiment of the present disclosure, a collapse of interaction caused by utterance of a user can be suppressed more reliably.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 22A is a diagram illustrating an example of task data according to Example of the third embodiment;

FIG. 22B is a diagram illustrating an example of sentence generation data according to Example of the third embodiment.

Figure 1:
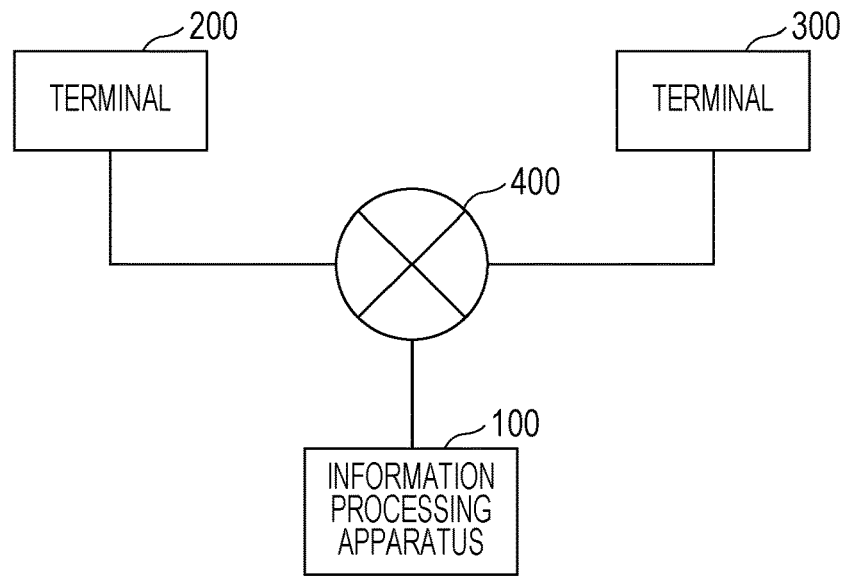
FIG. 1 is a schematic configuration diagram of an information processing system according to a first embodiment.

DETAILED DESCRIPTION (1) An information processing method according to an aspect of the present disclosure is an information processing method for performing, through interaction with a user, narrowing down regarding information that the user desires to search for. The information processing method is executed by a computer and includes: causing an output processor to output a first question, which is a first-type question, about a target of search, the first-type question being an open question; causing an input processor to obtain a first answer to the first question, the first answer being input by the user; if a determination is made indicating that the first answer does not satisfy a first condition and that, based on a database storing information about the target of search, a word or phrase corresponding to a word or phrase included in the first answer is not included in the database, causing the output processor to output a second question, which is the first-type question, for requesting an explanation about the word or phrase included in the first answer and not included in the database; if a determination is made indicating that the first answer does not satisfy the first condition and that, based on the database, the word or phrase corresponding to the word or phrase included in the first answer is included in the database, causing the output processor to output a third question, which is the first-type question, about the target of search; and if a determination is made indicating that the first answer satisfies the first condition, causing the output processor to output a fourth question, which is a second-type question, about the target of search, the second-type question being a closed question.

According to this aspect, conditions about information that the user desires to search for can be sufficiently obtained. Thus, candidates as the target of search desired by the user can be reliably narrowed down and presented.

(2) For example, the first condition may be determined to be satisfied if the first answer to the first question includes a word or phrase including a negative expression.

(3) For example, the output processor may be caused to output the first-type question in a form of voice or text.

(4) For example, the explanation about the word or phrase included in the first answer and not included in the database may be one of specific examples of the target of search.

(5) For example, the information processing method may further include registering, in the database, information that is based on a second answer to the second question, the second answer being input by the user and obtained by the input processor.

(6) For example, the information processing method may further include causing the input processor to obtain a third answer to the fourth question, the third answer being input by the user; and if the third answer is not an answer to the fourth question and is a request for an explanation about a first word or phrase included in the fourth question, causing the output processor to output an explanation sentence including a word or phrase related to the first word or phrase included in the fourth question and then causing the output processor to output the fourth question again.

(7) For example, the information processing method may further include, if a determination is made indicating that a state of progress in the narrowing down that has been performed by using a third answer to the fourth question satisfies a second condition, the third answer being input by the user and obtained by the input processor, causing the output processor to output information representing one or more candidates as the target of search, the one or more candidates being obtained through the narrowing down.

(8) For example, the second condition may be that a total number of candidates as the target of search is equal to or smaller than a predetermined value.

(9) For example, the target of search may be a medical condition of a patient, the first-type question may be a question asking a symptom noticed by the user, and the second-type question may be a question asking whether or not the user has one of a plurality of symptoms specifying the medical condition.

(10) For example, the target of search may be a plurality of cooking recipes or menus, the first-type question may be a question asking a condition for narrowing down the plurality of cooking recipes or menus, and the second-type question may be a question asking whether or not to request one of conditions for narrowing down the plurality of cooking recipes or menus.

(11) For example, in the database, a plurality of cooking recipes, category information representing categories of the plurality of cooking recipes, and ingredient information representing ingredients used in the plurality of cooking recipes may be associated with each other.

(12) For example, the target of search may be a plurality of travel plans, the first-type question may be a question asking a condition for narrowing down the plurality of travel plans, and the second-type question may be a question asking whether or not to request one of conditions for narrowing down the plurality of travel plans.

(13) For example, the target of search may be a plurality of real estate properties, the first-type question may be a question asking a condition for narrowing down the plurality of real estate properties, and the second-type question may be a question asking whether or not to request one of conditions for narrowing down the plurality of real estate properties.

(14) For example, the target of search may be a plurality of video content items, the first-type question may be a question asking a condition for narrowing down the plurality of video content items, and the second-type question may be a question asking whether or not to request one of conditions for narrowing down the plurality of video content items.

(15) An information processing apparatus according to an aspect of the present disclosure is an information processing apparatus that performs, through interaction with a user, narrowing down regarding information that the user desires to search for. The information processing apparatus includes an output processor, an input processor, and an interaction controller that controls the output processor and the input processor. The interaction controller causes the output processor to output a first question, which is a first-type question, about a target of search, the first-type question being an open question. The interaction controller causes the input processor to obtain a first answer to the first question, the first answer being input by the user. If the interaction controller determines that the first answer does not satisfy a first condition and that, based on a database storing information about the target of search, a word or phrase corresponding to a word or phrase included in the first answer is not included in the database, the interaction controller causes the output processor to output a second question, which is the first-type question, for requesting an explanation about the word or phrase included in the first answer and not included in the database. If the interaction controller determines that the first answer does not satisfy the first condition and that, based on the database, the word or phrase corresponding to the word or phrase included in the first answer is included in the database, the interaction controller causes the output processor to output a third question, which is the first-type question, about the target of search. If the interaction controller determines that the first answer satisfies the first condition, the interaction controller causes the output processor to output a fourth question, which is a second-type question, about the target of search, the second-type question being a closed question.

(16) A non-transitory recording medium storing a program according to an aspect of the present disclosure is a non-transitory recording medium storing a program that causes a computer to execute an information processing method for performing, through interaction with a user, narrowing down regarding information that the user desires to search for. The information processing method includes: causing an output processor to output a first question, which is a first-type question, about a target of search, the first-type question being an open question; causing an input processor to obtain a first answer to the first question, the first answer being input by the user; if a determination is made indicating that the first answer does not satisfy a first condition and that, based on a database storing information about the target of search, a word or phrase corresponding to a word or phrase included in the first answer is not included in the database, causing the output processor to output a second question, which is the first-type question, for requesting an explanation about the word or phrase included in the first answer and not included in the database; if a determination is made indicating that the first answer does not satisfy the first condition and that, based on the database, the word or phrase corresponding to the word or phrase included in the first answer is included in the database, causing the output processor to output a third question, which is the first-type question, about the target of search; and if a determination is made indicating that the first answer satisfies the first condition, causing the output processor to output a fourth question, which is a second-type question, about the target of search, the second-type question being a closed question.

It should be noted that these general or specific aspects may be implemented using a system, a method, an integrated circuit, a computer program, a computer-readable recording medium such as a compact disc-read only memory (CD-ROM), or any selective combination thereof.

Hereinafter, embodiments of the present disclosure will be described with reference to the drawings. The embodiments described below are all specific examples of the present disclosure. The values, shapes, elements, steps, and order of the steps described in the following embodiments are merely examples and do not limit the present disclosure. Among the elements described in the following embodiments, an element that is not described in an independent claim stating the broadest concept will be described as an optional element. In addition, any selective elements in all the embodiments may be combined together.

First Embodiment

Hereinafter, an information processing method and so forth according to a first embodiment will be described with reference to the drawings.

Information Processing System

FIG. 1 is a schematic configuration diagram of an information processing system according to the first embodiment of the present disclosure.

The information processing system illustrated in FIG. 1 includes an information processing apparatus 100 and a plurality of terminals including at least one of a terminal 200 and a terminal 300. The information processing apparatus 100 is connected to the plurality of terminals through a network 400.

The terminals 200 and 300 are an example of the plurality of terminals, and each may be a mobile terminal such as a smartphone, a tablet, or a mobile phone, or may be a terminal such as a personal computer. The terminal 200 or the terminal 300 is used by a user and performs input and output operations during interaction with the information processing apparatus 100. Two terminals are illustrated in the example in FIG. 1, but the number of terminals is not limited to two, and there may be three or more terminals.

The network 400 is a general-purpose network including the Internet, a wireless local area network (LAN), and the like, and relays communication between the information processing apparatus 100 and the terminal 200 or the like so as to connect these apparatuses.

The information processing apparatus 100 is implemented by a computer including a central processing unit (CPU), an input/output device, a communication device, and so forth, and serves as a server, for example. The information processing apparatus 100 outputs an interactive response to an input from a user, and thereby performs, through interaction with the user, narrowing down regarding information that the user desires to search for.

Hereinafter, the configuration of the information processing apparatus 100 will be described with reference to the drawings.

Configuration of Information Processing Apparatus 100

Figure 2:
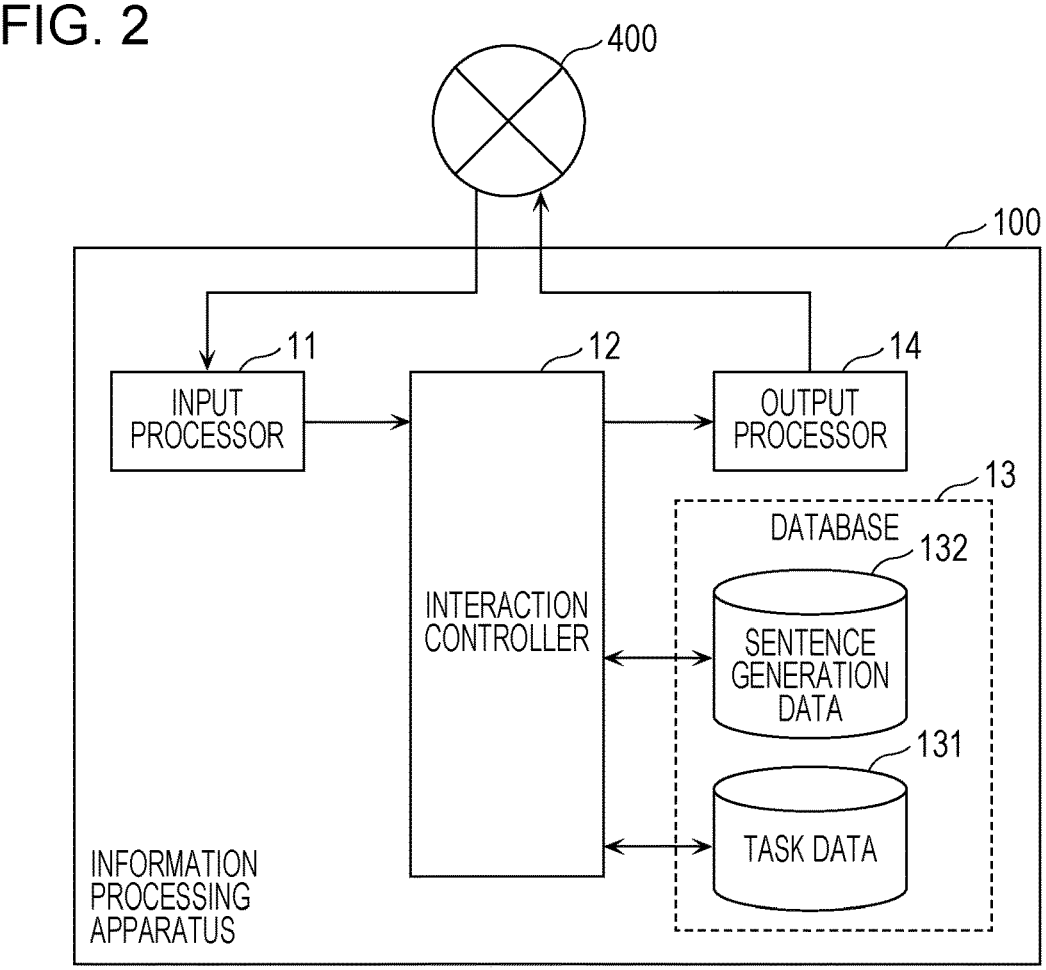
FIG. 2 is a block diagram illustrating an example configuration of an information processing apparatus according to the first embodiment.

FIG. 2 is a block diagram illustrating an example configuration of the information processing apparatus 100 according to the first embodiment. The information processing apparatus 100 illustrated in FIG. 2 includes an input processor 11, an interaction controller 12, a database 13, and an output processor 14.

Input Processor 11

The input processor 11, which is controlled by the interaction controller 12, processes an interactive input from a user and outputs an understanding result to the interaction controller 12. In the first embodiment, the input processor 11 obtains an answer to a question that is output from the output processor 14 to, for example, the terminal 200 used by the user. Subsequently, the input processor 11 processes the obtained answer and outputs an understanding result to the interaction controller 12. Here, expressions included in the answer vary according to a user, but a common keyword is output in response to similar inputs by using a commonly known language understanding technique. Subsequently, the input processor 11 processes the obtained answer and outputs an understanding result considering the matching with a keyword in task data 131, which will be described below. For example, to express a meaning similar to that of different expressions included in answers: "I have a fever", "I have a fever as well", "I have developed a fever", "I've got a fever", and so forth, a common keyword "fever", which is included in the task data 131, may be output.

The interaction with the user may be displayed in the form of text or may be output as voices. When the user makes an answer to a closed question, which will be described below, the user may make the answer by using a line of sight or gesture in addition to the foregoing method.

Output Processor 14

The output processor 14, which is controlled by the interaction controller 12, converts the format of a sentence to be output to a display format suitable for presentation to the user and outputs the sentence. The display format may be a display format using voices or text.

In the first embodiment, the output processor 14 outputs a first-type question or a second-type question about a target of search to, for example, the terminal 200 used by the user. Here, the first-type question means an open question and the second-type question means a closed question.

In addition, the output processor 14 outputs information representing one or more candidates as the target of search, which have been obtained through narrowing down.

If the target of search is a medical condition of a patient, for example, a first-type question is a question asking a symptom noticed by the user, and a second-type question is a question asking whether the user has one of a plurality of symptoms specifying the medical condition. The narrowed down candidates as the target of search represent one or a plurality of specified medical conditions of the patient. Specific examples will be described below.

Interaction Controller 12

The interaction controller 12 has a function of deciding on an output sentence, which is a question or answer to the user, by using an understanding result output from the input processor 11 and the database 13. The interaction controller 12 also has, in addition to the function of deciding on an output sentence, a function of managing the number of candidates for information desired by the user, that is, information that the user desires to search for, and managing management information, which is information to be presented as an example of a user's response to the output sentence that has been decided on.

In the first embodiment, the interaction controller 12 refers to the task data 131 and the sentence generation data 132 included in the database 13 and performs, through interaction with the user, narrowing down regarding information that the user desires to search for in cooperation with the input processor 11 and the output processor 14.

For example, the interaction controller 12 controls the output processor 14 to output a first-type question or a second-type question about a target of search, and controls the input processor 11 to obtain an answer to the question output from the output processor 14.

The interaction controller 12 causes the output processor 14 to first output a first-type question, not a second-type question. If the interaction controller 12 determines that an answer obtained by the input processor 11 satisfies a first condition, the interaction controller 12 causes the output processor 14 to output a second-type question. On the other hand, if the interaction controller 12 determines that the answer obtained by the input processor 11 does not satisfy the first condition, the interaction controller 12 causes the output processor 14 to further output a first-type question. The interaction controller 12 determines whether or not an answer obtained by the input processor 11 includes a trigger to end an open question. For example, if the answer includes a word or phrase including a negative expression with respect to the question output from the output processor 14, the interaction controller 12 may determine that the answer includes a trigger to end an open question and that the first condition is satisfied. The case where it is determined that the first condition is satisfied is not limited to a case where the user's answer includes a word or phrase including a negative expression. It may be determined that the first condition is satisfied if a predetermined number of questions have been made or if a predetermined number of candidates as a target of search have been obtained through narrowing down.

If the interaction controller 12 determines that a state of progress in the narrowing down that has been performed by using an answer to the second-type question obtained by the input processor 11 satisfies a second condition, the interaction controller 12 causes the output processor 14 to output information representing candidates as the target of search, obtained through the narrowing down. Here, the second condition is that the number of candidates as the target of search is equal to or smaller than a predetermined value, for example, 4.

Database 13

The database 13 is formed of, for example, a rewritable nonvolatile memory, such as a hard disk drive or a solid state drive, and stores information about a target of search. More specifically, the database 13 stores a plurality of candidates as a target of search, category information representing the categories of the plurality of candidates, and element information forming the plurality of candidates, which are associated with each other.

In the first embodiment, the database 13 includes the task data 131 that is referred to for achieving a task and the sentence generation data 132 that tis referred to for generating a sentence, as illustrated in FIG. 2. The task data 131 is an example of a knowledge base, and is a database in which knowledge, including relations between a plurality of candidates as a target of search and element information (keywords) representing a feature, attribute, condition, and so forth such as relations between diseases and subjective symptoms, is described in a specific expression format. The task data 131 is used by the interaction controller 12 to decide on a keyword to be included in an output sentence or information representing candidates as a target of search. The sentence generation data 132 stores templates of open questions and templates of closed questions that are referred to by the interaction controller 12.

Process in Information Processing Apparatus 100

Next, a process performed in the information processing apparatus 100 having the above-described configuration will be described.

Figure 3:
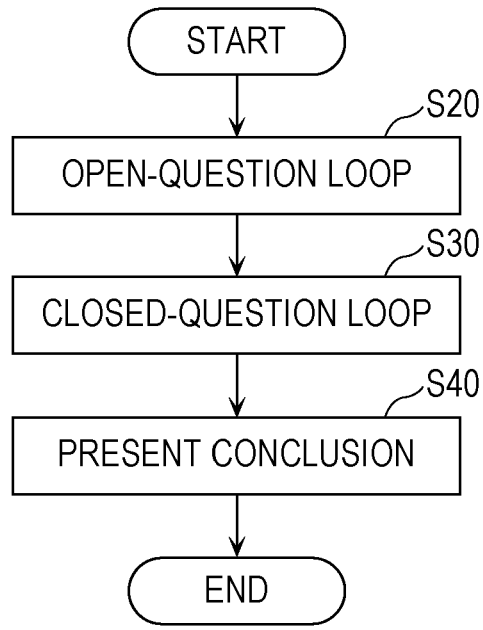
FIG. 3 is a flowchart illustrating an outline of a process performed in the information processing apparatus according to the first embodiment.
Figure 4:
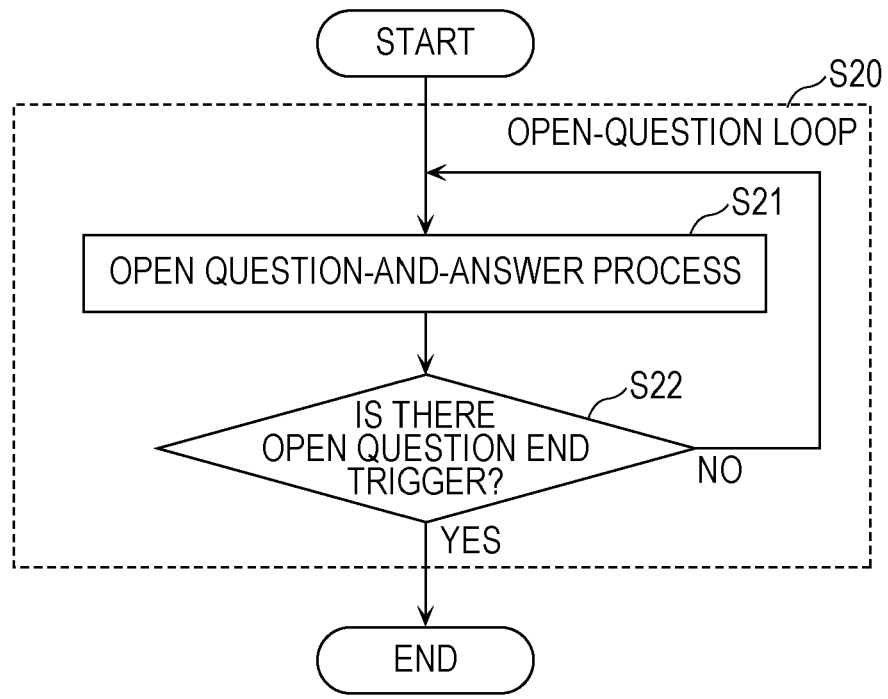
FIG. 4 is a flowchart illustrating an example of the details of an open-question loop illustrated in FIG. 3.
Figure 5:
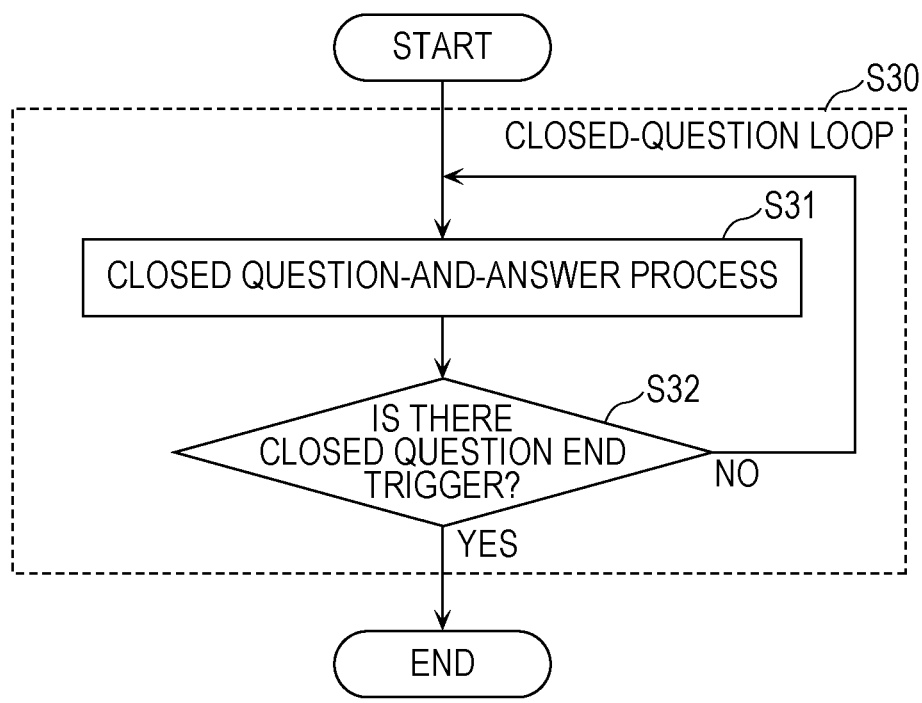
FIG. 5 is a flowchart illustrating an example of the details of a closed-question loop illustrated in FIG. 3.

FIG. 3 is a flowchart illustrating an outline of the process performed in the information processing apparatus 100 according to the first embodiment. FIG. 4 is a flowchart illustrating an example of the details of an open-question loop illustrated in FIG. 3. FIG. 5 is a flowchart illustrating an example of the details of a closed-question loop illustrated in FIG. 3.

First, the information processing apparatus 100 performs a process of an open-question loop in step S20. More specifically, as illustrated in FIG. 4, the information processing apparatus 100 performs an open question-and-answer process of outputting an open question about a target of search and obtaining and understanding a user's answer to the question in step S21. For example, if the information processing apparatus 100 outputs an open question "Any other symptoms?", an answer including additional information about a symptom noticed by the user, such as a subjective symptom, or a negative answer including a word or phrase including a negative expression is obtained. Subsequently, in step S22, the information processing apparatus 100 determines whether or not the user's answer that has been understood includes an open question end trigger. The open question end trigger corresponds to the above-described first condition. If it is determined in step S22 that the user's answer includes a word or phrase including a negative expression (YES in step S22), the information processing apparatus 100 determines that the first condition is satisfied, that is, there is an open question end trigger, and quits the present loop. On the other hand, if it is determined in step S22 that the user's answer does not include a word or phrase including a negative expression (NO in step S22), for example, if the user's answer includes additional information, the information processing apparatus 100 determines that the first condition is not satisfied, that is, there is no open question end trigger, and the process returns to step S21.

In this way, the information processing apparatus 100 repeats the open question-and-answer process until the first condition is satisfied.

Subsequently, the information processing apparatus 100 performs a process of a closed-question loop in step S30. More specifically, as illustrated in FIG. 5, the information processing apparatus 100 performs a closed question-and-answer process of outputting a closed question about a target of search and obtaining and understanding a user's answer to the question in step S31. For example, if the information processing apparatus 100 outputs a closed question "Do you have a runny nose?", a positive answer "Yes" or a negative answer "No" is obtained. Subsequently, in step S32, the information processing apparatus 100 determines whether or not there is a closed question end trigger in the progress of narrowing down using the user's answer that has been understood. The closed question end trigger corresponds to the above-described second condition and is being equal to or smaller than a predetermined value (threshold). In step S32, the information processing apparatus 100 narrows down candidates for "medical condition", which is information that the user desires to search for, in accordance with whether or not there is a "running nose", which is one of symptoms obtained from a positive answer or a negative answer. If the number of narrowed down candidates for the information is equal to or smaller than the predetermined value (YES in step S32), the information processing apparatus 100 determines that there is a closed question end trigger and quits the present loop. On the other hand, if the number of narrowed down candidates for the information is not equal to or smaller than the predetermined value (that is, larger than the predetermined value; NO in step S32), the information processing apparatus 100 determines that the second condition is not satisfied, that is, there is no closed question end trigger, and the process returns to step S31.

In this way, the information processing apparatus 100 repeats the closed question-and-answer process until the second condition is satisfied.

Subsequently, the information processing apparatus 100 presents an output sentence including a conclusion to the user in step S40. Specifically, the information processing apparatus 100 outputs, as an output sentence including a conclusion, information representing the candidates as the target of search that are narrowed down in step S32.

Hereinafter, specific methods for performing, through interaction with a user, narrowing down regarding information that the user desires to search for will be described as Examples.

Example 1

In Example 1, a description will be given of the case of performing, as a task of performing narrowing down regarding information that a user desires to search for, a task (medical interview) of narrowing down diseases on the basis of a plurality of subjective symptoms. That is, a description will be given of a case where a target of search is a medical condition of a patient, an open question as a first-type question is a question asking a symptom noticed by the user, and a closed question as a second-type question is a question asking whether or not the user has one of a plurality of symptoms specifying the medical condition.

Figures 6A, 6B:
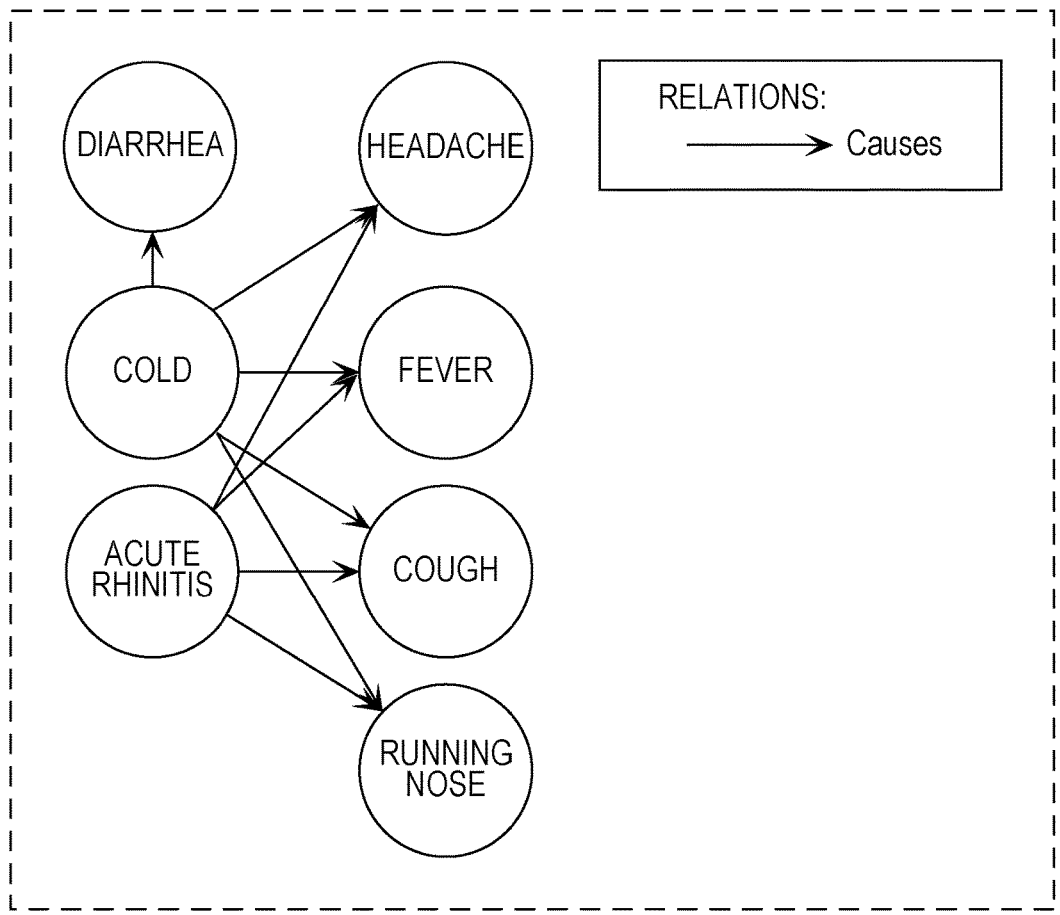
FIG. 6A is a diagram illustrating an example of task data according to Example 1 of the first embodiment.
FIG. 6B is a diagram illustrating an example of sentence generation data according to Example 1 of the first embodiment.

FIG. 6A is a diagram illustrating an example of the task data 131 according to Example 1 of the first embodiment.

FIG. 6A illustrates, as an example of the task data 131, a knowledge base in which the relations between diseases and subjective symptoms (hereinafter simply referred to as symptoms) are expressed in the form of a digraph. FIG. 6A corresponds to illustration of a part of a huge knowledge base.

Generally, in a digraph expressing knowledge, a circle is called a node and an arrow is called an edge. A set of a node, another node, and an edge connecting the nodes is called a triple. A concept is linked to each node and the two concepts are linked to each other by the edge (line segment). The relation between the concepts represented by the triple is a unit of knowledge.

In the example illustrated in FIG. 6A, diseases (names of diseases) correspond to a plurality of candidates as a target of search, and symptoms correspond to element information (keywords) representing a feature, attribute, condition, or the like. In addition, FIG. 6A illustrates a relation in which "cold" in node 1 causes a symptom in node 2 such as a headache, fever, cough, running nose, or diarrhea, and a relation in which "headache" in node 2 is also caused by another disease in node 1 accompanied by a fever, such as acute rhinitis.

Thus, node 2 in [node 1 Causes node 2] is regarded as a search keyword, node 1 linked thereto is regarded as a target to be searched for, and the keywords of AND search of a plurality of keywords are increased, so that information satisfying a plurality of conditions can be found through narrowing down. In this way, diseases can be narrowed down on the basis of a plurality of symptoms.

The keywords include a positive keyword and a negative keyword. A positive keyword is used to perform search under a condition where the keyword is included, whereas a negative keyword is used to perform search under a condition where the keyword is not included.

There is an algorithm for examining a keyword to be added to a plurality of keywords in order to effectively narrow down information, for example, a decision tree algorithm. With use of such an algorithm, a keyword that is effective for narrowing down can be selected so that, if the information obtained through narrowing down is divided into a group linked to a certain keyword and a group unlinked to the keyword, the sizes of the two groups (the numbers of diseases in the two groups) are equal to each other as much as possible. In Example 1, a keyword that is effective for narrowing down is calculated in accordance with a predetermined algorithm every time a user's answer is obtained.

FIG. 6B is a diagram illustrating an example of the sentence generation data 132 according to Example 1 of the first embodiment. FIG. 6B illustrates an example of templates of open questions and a template of a closed question, which are referred to by the information processing apparatus 100.

That is, in a case where the information processing apparatus 100 outputs an open question about a target of search, the information processing apparatus 100 generates a question sentence "What is the problem today?" as a first open question illustrated in FIG. 6B at the beginning of interaction with the user, and then (repeatedly) generates a question sentence "Any other symptoms?" as a second or later open question illustrated in FIG. 6B.

In a case where the information processing apparatus 100 outputs a closed question about a target of search, the information processing apparatus 100 outputs a closed question "Do you have symptom X?" illustrated in FIG. 6B by using one template that is the same regardless of a condition. The part "symptom X" is replaced with one of the keywords indicated in node 2 of the task data 131 illustrated in FIG. 6A. "Symptom X" may be replaced with one keyword selected each time as a keyword that is effective for narrowing down among the keywords indicated in node 2 that are obtained by referring to the task data 131 by the information processing apparatus 100.

In the example illustrated in FIG. 6B, each question sentence does not have variations, but the question sentence may be varied to form a plurality of templates, and one of the templates may be randomly selected to generate a question sentence.

Figure 7:
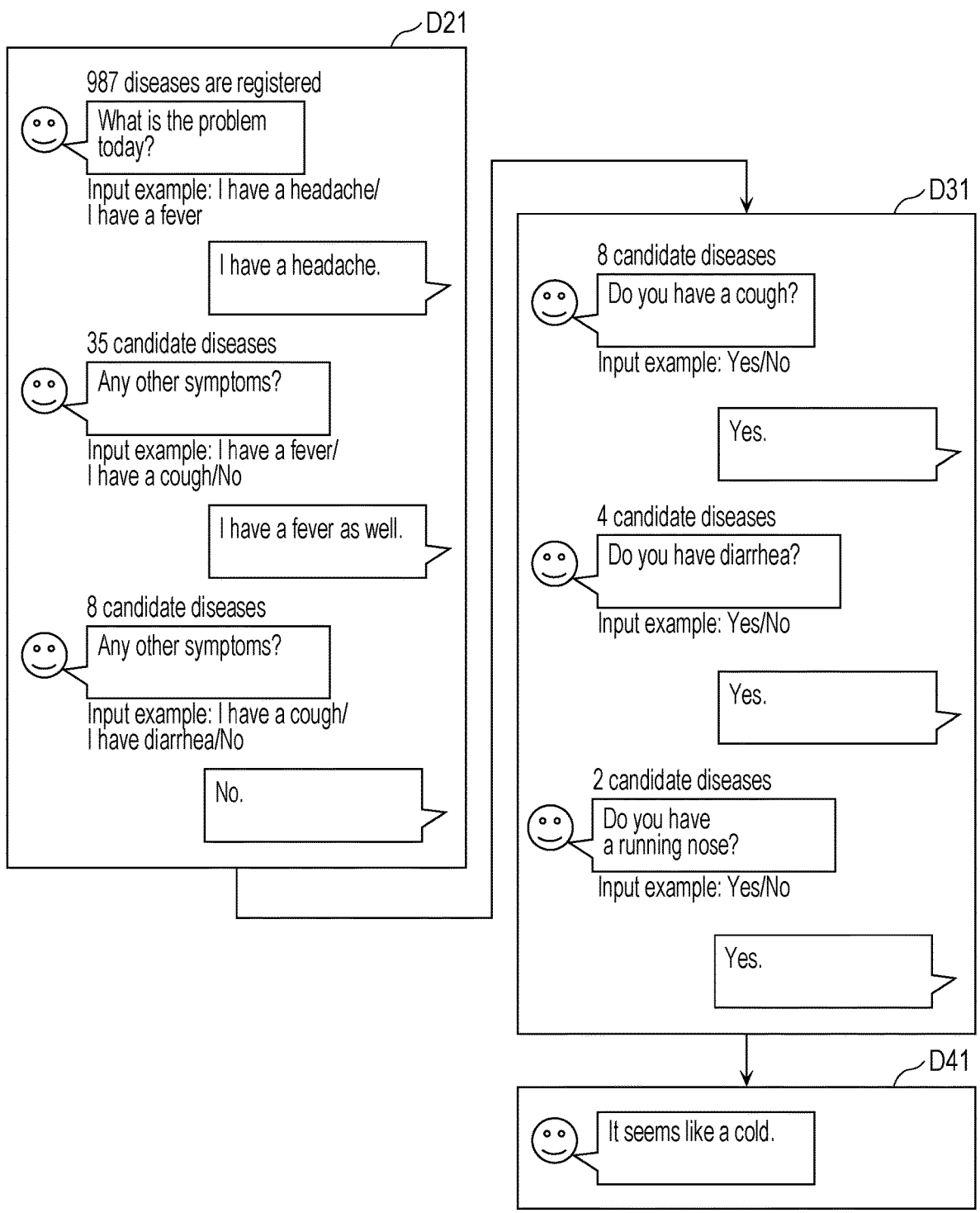
FIG. 7 is a diagram illustrating an example of display screens according to Example 1 of the first embodiment.

FIG. 7 is a diagram illustrating an example of display screens according to Example 1 of the first embodiment. A display screen D21 shows an example of interaction in the process of the open-question loop in step S20, and a display screen D31 shows an example of interaction in the process of the closed-question loop in step S30, A display screen D41 shows an example of a conclusion presented in step 340.

Hereinafter, a description will be given in accordance with the processes illustrated in FIGS. 4 and 5.

It is assumed that the number of candidates of diseases, that is, candidates of disease information, registered as a target of search in an initial state is 987.

In this case, as shown in the display screen D21, the information processing apparatus 100 first outputs "What is the problem today?" as a first open question about the target of search with reference to FIG. 6B in step S21, and the user answers "I have a headache". The information processing apparatus 100 extracts a keyword "headache" from the user's answer and narrows down the candidates of disease information to 35 candidates by using the extracted keyword "headache", Subsequently, in step S22, the information processing apparatus 100 determines whether or not the user's answer obtained in step S21 includes an open question end trigger. Since the user's answer "I have a headache" does not include a negative expression and the first condition is not satisfied, the process returns to step S21.

Subsequently, in step S21, the information processing apparatus 100 outputs "Any other symptoms?" as a second open question about the target of search with reference to FIG. 6B, and the user answers "I have a fever as well", The information processing apparatus 100 extracts a keyword "fever" from the user's answer and narrows down the candidates of disease information to 8 candidates by using the extracted keyword "fever". Subsequently, in step 322, the information processing apparatus 100 determines whether or not the user's answer obtained in step S21 includes an open question end trigger. Since the user's answer "I have a fever as well" does not include a negative expression, the process returns to step S21 again.

Subsequently, in step S21, the information processing apparatus 100 outputs "Any other symptoms?" as a third open question about the target of search with reference to FIG. 6B, and the user answers "No". The information processing apparatus 100 obtains, from the user's answer, an understanding result indicating that the answer includes a negative expression. Subsequently, in step S22, the information processing apparatus 100 determines that the user's answer obtained in step S21 includes a negative expression and an open question end trigger. Accordingly, the information processing apparatus 100 quits the open-question loop (step 320) and proceeds to the process of the closed-question loop (step S30).

Subsequently, as shown in the display screen D31, the information processing apparatus 100 selects a closed question "Do you have symptom X?" with reference to FIG. 6B in step 331 and selects "cough" as a keyword that replaces symptom X with reference to the task data 131 illustrated in FIG. 6A. In this way, the information processing apparatus 100 outputs "Do you have a cough?" as a closed question about the target of search, and the user answers "Yes". The information processing apparatus 100 extracts a keyword "cough" from the user's answer and understands that the extracted keyword "cough" is a positive keyword. The information processing apparatus 100 narrows down the candidates of disease information to 4 candidates by using the extracted keyword "cough". Subsequently, in step S32, the information processing apparatus 100 determines whether or not the user's answer obtained in step S31 includes a closed question end trigger. For example, the number of candidates of disease information that have been narrowed down by using the user's answer is 4, which is not equal to or less than 1 as a predetermined value, and thus the second condition is not satisfied. Accordingly, the process returns to step S31.

A question sentence "Do you cough?" is more natural than "Do you have a cough?" Thus, if the template of a closed question illustrated in FIG. 6B includes a plurality of templates having a meaning similar to "Do you have symptom X?", the information processing apparatus 100 may select a more natural template from among the plurality of templates depending on the keyword that replaces symptom X and may output a sentence.

Subsequently, in step S31, the information processing apparatus 100 outputs "Do you have diarrhea?" as a closed question about the target of search by using a method similar to that described above, and the user answers "Yes". The information processing apparatus 100 extracts a keyword "diarrhea" from the user's answer and understands that the extracted keyword "diarrhea" is a positive keyword. The information processing apparatus 100 narrows down the candidates of disease information to 2 candidates by using the extracted keyword "diarrhea". Subsequently, in step S32, the number of candidates of disease information that have been narrowed down by using the user's answer obtained in step S31 is 2, which is not equal to or less than 1 as the predetermined value, and thus the information processing apparatus 100 returns to step S31 again.

Subsequently, in step S31, the information processing apparatus 100 outputs "Do you have a running nose?" as a closed question about the target of search by using a method similar to that described above, and the user answers "Yes". The information processing apparatus 100 extracts a keyword "running nose" from the user's answer and understands that the extracted keyword "running nose" is a positive keyword. The information processing apparatus 100 narrows down the candidates of disease information to 1 candidate by using the extracted keyword "running nose". Subsequently, in step S32, the number of candidates of disease information that have been narrowed down by using the user's answer is 1, which is equal to 1 as the predetermined value, and thus the second condition is satisfied. Accordingly, the information processing apparatus 100 determines that there is a closed question end trigger. In this way, the information processing apparatus 100 quits the closed-question loop (step S30) and proceeds to step S40.

Finally, in step S40, the information processing apparatus 100 outputs "It seems like a cold" as a conclusion indicating that the disease seems like a "cold", and the conclusion is presented to the user.

As described above, the information processing apparatus 100 constantly generates a question to the user, thereby taking the initiative in a flow of interaction, that is, performing system-led interaction control. The information processing apparatus 100 repeatedly outputs an open question until narrowing-down conditions have been presented through user's utterance, thereby being capable of obtaining all conditions about information that the user desires to search for and increasing user satisfaction. Then the information processing apparatus 100 repeatedly outputs a closed question, thereby further performing narrowing down to find the information that the user desires to search for. In this way, conditions about the information that the user desires to search for can be sufficiently obtained, and thus the candidates for the target that the user desires to search for can be reliably narrowed down and presented. That is, a task of providing candidates for the target that the user desires to search for is achieved, and thus user satisfaction can be increased.

Example 2

In Example 2, a description will be given of the case of performing, as a task of performing narrowing down regarding information that a user desires to search for, a task of performing narrowing down to find one or more recipes satisfying a plurality of conditions. That is, a description will be given of a case where a target of search is a plurality of cooking recipes or menus, an open question as a first-type question is a question asking a condition for narrowing down the plurality of cooking recipes or menus, and a closed question as a second-type question is a question asking whether or not to request one of conditions for narrowing down the plurality of cooking recipes or menus.

Figures 8A, 8B:
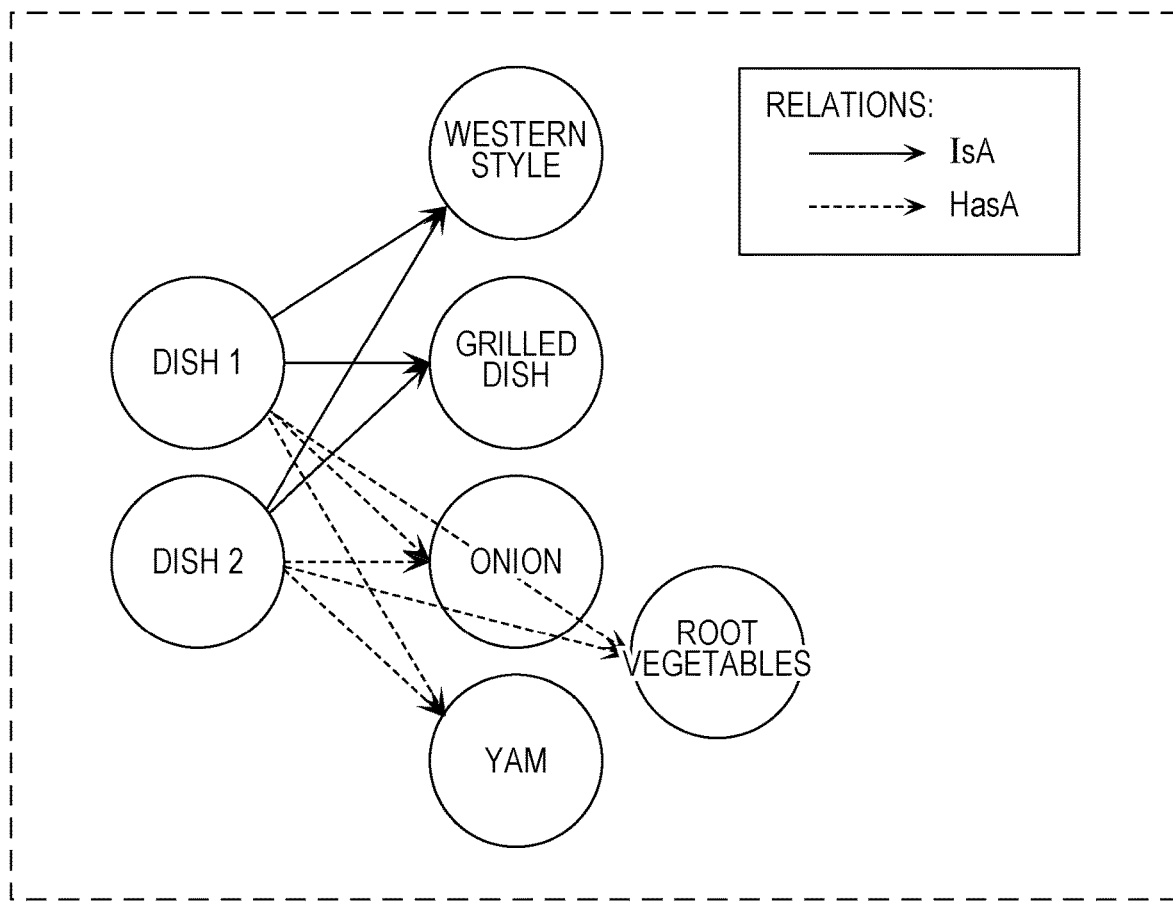
FIG. 8A is a diagram illustrating an example of ask data according to Example 2 of the first embodiment.
FIG. 8B is a diagram illustrating an example of sentence generation data according to Example 2 of the first embodiment.

FIG. 8A is a diagram illustrating an example of the task data 131 according to Example 2 of the first embodiment.

FIG. 8A illustrates, as an example of the task data 131, a knowledge base in which the relations between dishes and their categories and the relations between dishes and ingredients are expressed in the form of a digraph. In other words, in the task data 131, a plurality of cooking recipes, category information representing the categories of the plurality of cooking recipes, and ingredient information representing the ingredients used in the plurality of cooking recipes are associated with each other. FIG. 8A corresponds to illustration of a part of a huge knowledge base, like FIG. 6A.

In the example illustrated in FIG. 8A, dishes 1 and 2 correspond to a plurality of candidates as a target of search, and Western style, grilled dish, onion, and so forth correspond to element information (keywords) representing a feature, attribute, condition, or the like. In addition, FIG. 8A illustrates a relation in which each of dish 1 and dish 2 in node 1 is a kind of Western-style dish in node 2 and is a kind of grilled dish in node 2. FIG. 8A also illustrates a relation in which each of dish 1 and dish 2 in node 1 is made by using onion and yam as ingredients. FIG. 8A also illustrates a relation in which root vegetables, which correspond to a broader concept of onion and yam, are ingredients of dish 1 and dish 2. To represent these relations, two types of relation signs "IsA" and "HasA" are applied.

Thus, node 2 in [node 1 IsA node 2] or [node 1 HasA node 2] is regarded as a keyword, node 1 linked thereto is regarded as a target to be searched for, and the keywords of AND search of a plurality of keywords are increased, so that information satisfying a plurality of conditions can be found through narrowing down. In this way, desired cooking recipe information can be found through narrowing down on the basis of a plurality of conditions.

FIG. 8B is a diagram illustrating an example of the sentence generation data 132 according to Example 2 of the first embodiment. FIG. 8B illustrates an example of templates of open questions and templates of closed questions, which are referred to by the information processing apparatus 100.

That is, in a case where the information processing apparatus 100 outputs an open question about a target of search, the information processing apparatus 100 generates a question sentence "What kind of recipe are you looking for?" as a first open question illustrated in FIG. 8B at the beginning of interaction with the user, and then (repeatedly) generates a question sentence "Any other conditions?" as a second or later open question illustrated in FIG. 8B.

In a case where the information processing apparatus 100 outputs a closed question about a target of search, the information processing apparatus 100 outputs a closed question by using a template illustrated in FIG. 8B in accordance with whether the relation between a keyword (node 2) and the target to be searched for (node 1) is IsA or HasA. If the relation is IsA, the information processing apparatus 100 outputs the closed question "Would you like node 2?" illustrated in FIG. 8B. If the relation is HasA, the information processing apparatus 100 outputs the closed question "Do you use node 2?" illustrated in FIG. 8B.

Figure 9:
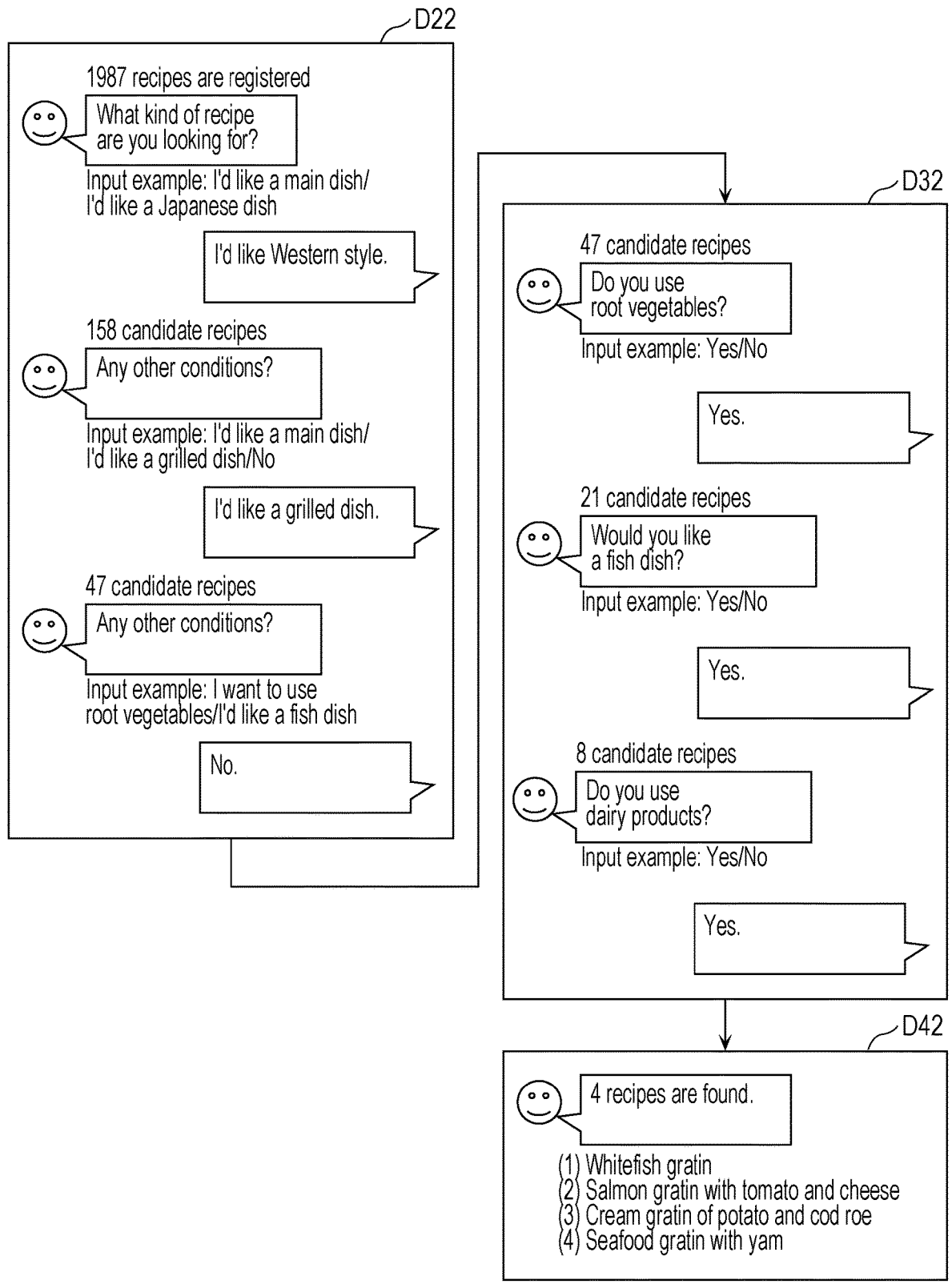
FIG. 9 is a diagram illustrating an example of display screens according to Example 2 of the first embodiment.

FIG. 9 is a diagram illustrating an example of display screens according to Example 2 of the first embodiment.

A display screen D22 shows an example of interaction in the process of the open-question loop in step S20, and a display screen D32 shows an example of interaction in the process of the closed-question loop in step 330. A display screen D42 shows an example of a conclusion presented in step S40.

Hereinafter, a description will be given in accordance with the processes illustrated in FIGS. 4 and 5.

It is assumed that the number of candidates of recipes or menus, that is, candidates of recipe information, registered as a target of search in an initial state is 1987.

In this case, as shown in the display screen D22, the information processing apparatus 100 first outputs "What kind of recipe are you looking for?" as a first open question about the target of search with reference to FIG. 8B in step S21, and the user answers "I'd like Western style". The information processing apparatus 100 extracts a keyword "Western style" from the user's answer and narrows down the candidates of recipe information to 158 candidates by using the extracted keyword "Western style". Subsequently, in step S22, the information processing apparatus 100 determines whether or not the user's answer obtained in step S21 includes an open question end trigger. Since the user's answer "I'd like Western style" does not include a negative expression and the first condition is not satisfied, the process returns to step S21.

Subsequently, in step S21, the information processing apparatus 100 outputs "Any other conditions?" as a second open question about the target of search with reference to FIG. 8B, and the user answers "I'd like a grilled dish". The information processing apparatus 100 extracts a keyword "grilled dish" from the user's answer and narrows down the candidates of recipe information to 47 candidates by using the extracted keyword "grilled dish". Subsequently, in step S22, the information processing apparatus 100 determines whether or not the user's answer obtained in step S21 includes an open question end trigger. Since the user's answer "I'd like a grilled dish" does not include a negative expression, the process returns to step S21 again.

Subsequently, in step S21, the information processing apparatus 100 outputs "Any other conditions?" as a third open question about the target of search with reference to FIG. 8B, and the user answers "No". The information processing apparatus 100 obtains, from the user's answer, an understanding result indicating that the answer includes a negative expression. Subsequently, in step S22, the information processing apparatus 100 determines that the user's answer obtained in step S21 includes a negative expression and an open question end trigger. Accordingly, the information processing apparatus 100 quits the open-question loop (step S20) and proceeds to the process of the closed-question loop (step S30).

Subsequently, as shown in the display screen D32, the information processing apparatus 100 selects a closed question "Do you use node 2?" with reference to FIG. 8B in step S31 when a keyword "root vegetables" and an applied relation sign "HasA" are given. As a result, the information processing apparatus 100 outputs "Do you use root vegetables?" and the user answers "Yes". The information processing apparatus 100 extracts a keyword "root vegetables" from the user's answer and understands that the extracted keyword "root vegetables" is a positive keyword. The information processing apparatus 100 narrows down the candidates of recipe information to 21 candidates by using the extracted keyword "root vegetables", Subsequently, in step S32, the information processing apparatus 100 determines whether or not the user's answer obtained in step S31 includes a closed question end trigger. For example, the number of candidates of recipe information that have been narrowed down by the user's answer is 21, which is not equal to or less than 4 as a predetermined value, and thus the second condition is not satisfied. Accordingly, the process returns to step S31.

Subsequently, in step S31, the information processing apparatus 100 outputs "Would you like a fish dish?" as a closed question about the target of search by using a method similar to that described above, and the user answers "Yes". The information processing apparatus 100 extracts a keyword "fish dish" from the user's answer and understands that the extracted keyword "fish dish" is a positive keyword. The information processing apparatus 100 narrows down the candidates of recipe information to 8 candidates by using the extracted keyword "fish dish", Subsequently, in step S32, the number of candidates of recipe information that have been narrowed down by using the user's answer obtained in step S31 is 8, which is not equal to or less than 4 as the predetermined value, and thus the information processing apparatus 100 returns to step S31 again.

Subsequently, in step S31, the information processing apparatus 100 outputs "Do you use dairy products?" as a closed question about the target of search by using a method similar to that described above, and the user answers "Yes". The information processing apparatus 100 extracts a keyword "dairy products" from the user's answer and understands that the extracted keyword "dairy products" is a positive keyword. The information processing apparatus 100 narrows down the candidates of recipe information to 4 candidates by using the extracted keyword "dairy products". Subsequently, in step S32, the number of candidates of recipe information that have been narrowed down by using the user's answer is 4, which is equal to 4 as the predetermined value, and thus the second condition is satisfied. Accordingly, the information processing apparatus 100 determines that there is a closed question end trigger. In this way, the information processing apparatus 100 quits the closed-question loop (step S30) and proceeds to step S40.

Finally, in step S40, the information processing apparatus 100 outputs "4 recipes are found" as a conclusion indicating that four pieces of recipe information satisfy the conditions, and the conclusion is presented to the user.

As described above, the information processing apparatus 100 of Example 2, like that of Example 1, is capable of sufficiently obtaining conditions about the information that the user desires to search for, and thus the candidates for the target that the user desires to search for can be reliably narrowed down and presented. That is, a task can be achieved also in Example 2 different from Example 1 only by replacing the task data 131 and the sentence generation data 132 illustrated in Example 1.

Example 3

In Example 3, a description will be given of the case of performing, as a task of performing narrowing down regarding information that a user desires to search for, a task of performing narrowing down to find one or more travel plans satisfying a plurality of conditions. That is, a description will be given of a case where a target of search is a plurality of travel plans, an open question as a first-type question is a question asking a condition for narrowing down the plurality of travel plans, and a closed question as a second-type question is a question asking whether or not to request one of conditions for narrowing down the plurality of travel plans.

Figures 10A, 10B:
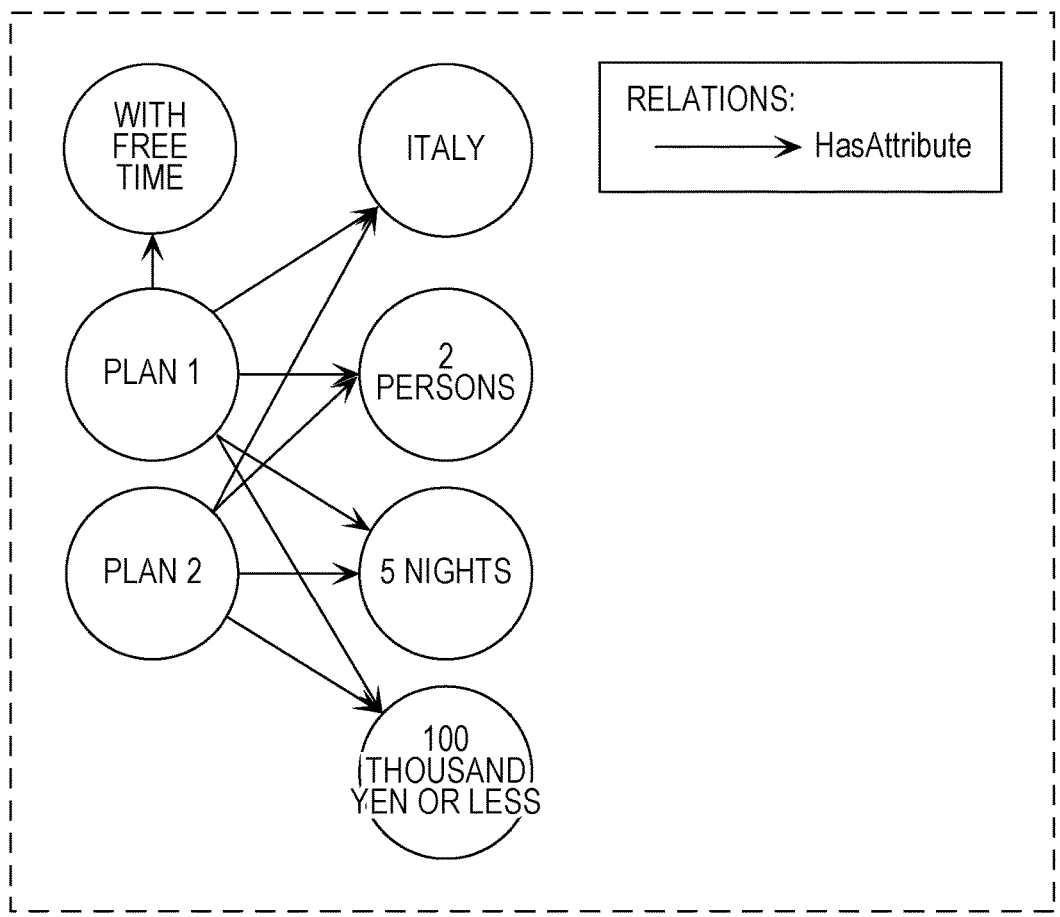
FIG. 10A is a diagram illustrating an example of task data according to Example 3 of the first embodiment.
FIG. 10B is a diagram illustrating an example of sentence generation data according to Example 3 of the first embodiment.

FIG. 10A is a diagram illustrating an example of the task data 131 according to Example 3 of the first embodiment. FIG. 10A illustrates, as an example of the task data 131, a knowledge base in which the relations between travel plans and conditions are expressed in the form of a digraph. FIG. 10A corresponds to illustration of a part of a huge knowledge base.

In the example illustrated in FIG. 10A, plans 1 and 2 correspond to a plurality of candidates as a target of search, and Italy, 2 persons, and so forth correspond to element information (keywords) representing a feature, attribute, condition, or the like. In addition, FIG. 10A illustrates a relation in which "plan 1" in node 1 satisfies the conditions in node 2 including Italy, 2 persons, 5 nights, and 100 thousand yen or less, and a relation in which "Italy" in node 2 relates to another travel plan in node 1, such as plan 2, satisfying a condition of 100 thousand yen or less. To represent these relations, a relation sign "HasAttribute" is applied.

Thus, node 2 in [node 1 HasAttribute node 2] is regarded as a keyword, node 1 linked thereto is regarded as a target to be searched for, and the keywords of AND search of a plurality of keywords are increased, so that information satisfying a plurality of conditions can be found through narrowing down. In this way, travel plans can be narrowed down on the basis of a plurality of conditions.

FIG. 10B is a diagram illustrating an example of the sentence generation data 132 according to Example 3 of the first embodiment. FIG. 10B illustrates an example of templates of open questions and a template of a closed question, which are referred to by the information processing apparatus 100.

That is, in a case where the information processing apparatus 100 outputs an open question about a target of search, the information processing apparatus 100 generates a question sentence "What kind of travel plan are you looking for?" as a first open question illustrated in FIG. 10B at the beginning of interaction with the user, and then (repeatedly) generates a question sentence "Any other conditions?" as a second or later open question illustrated in FIG. 10B.

In a case where the information processing apparatus 100 outputs a closed question about a target of search, the information processing apparatus 100 outputs a closed question "Would you like condition X?" illustrated in FIG. 10B by using one template that is the same regardless of a condition. The part "condition X" is replaced with one of the keywords indicated in node 2 of the task data 131 illustrated in FIG. 10A. "Condition X" may be replaced with one keyword selected each time as a keyword that is effective for narrowing down among the keywords indicated in node 2 that are obtained by referring to the task data 131 by the information processing apparatus 100.

Figure 11:
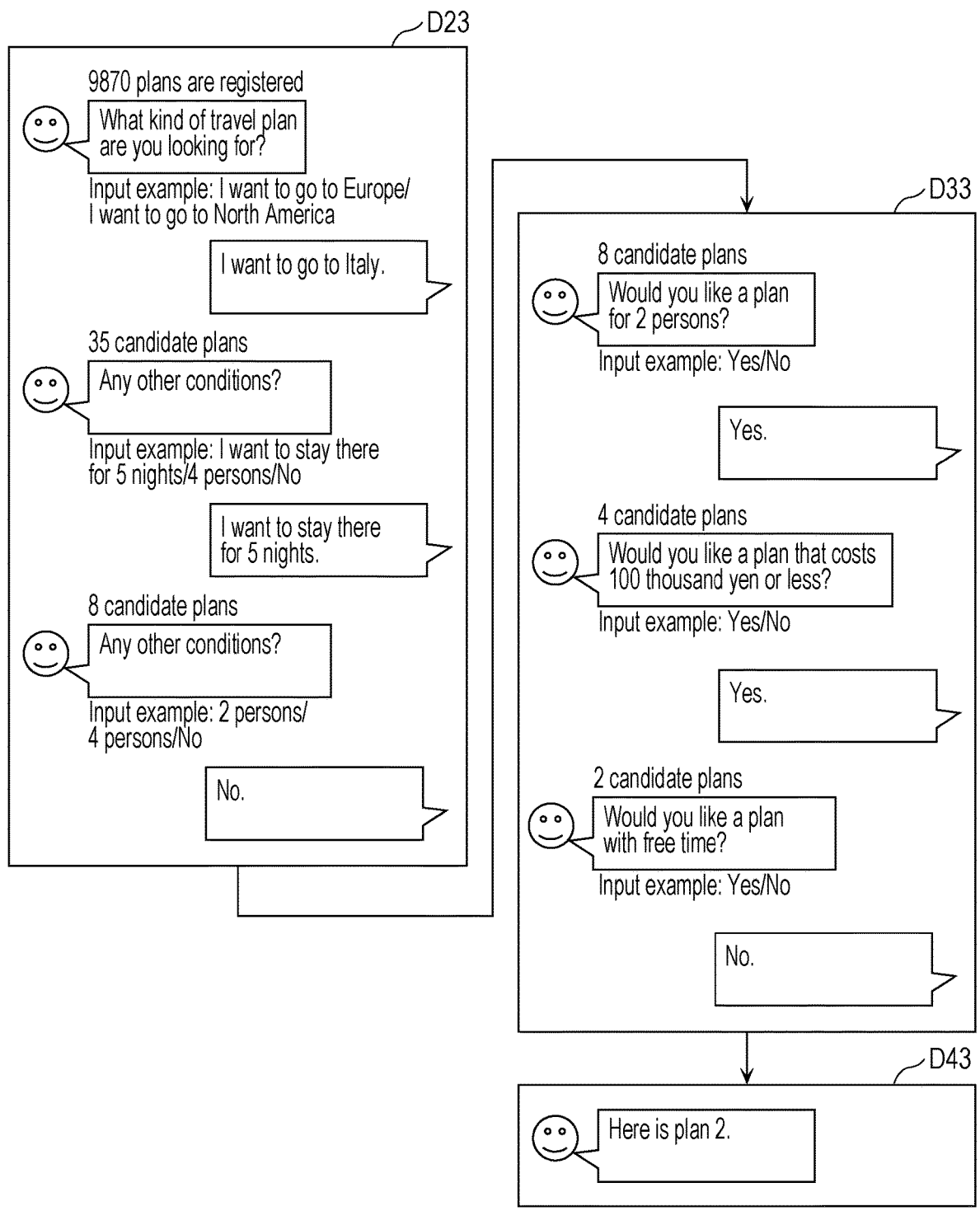
FIG. 11 is a diagram illustrating an example of display screens according to Example 3 of the first embodiment.

FIG. 11 is a diagram illustrating an example of display screens according to Example 3 of the first embodiment. A display screen D23 shows an example of interaction in the process of the open-question loop in step S20, and a display screen D33 shows an example of interaction in the process of the closed-question loop in step S30. A display screen D43 shows an example of a conclusion presented in step S40.

Hereinafter, a description will be given in accordance with the processes illustrated in FIGS. 4 and 5.

It is assumed that the number of candidates of travel plans, that is, candidates of plan information, registered as a target of search in an initial state is 9870.

In this case, as shown in the display screen D23, the information processing apparatus 100 first outputs "What kind of travel plan are you looking for?" as a first open question about the target of search with reference to FIG. 10B in step S21, and the user answers "I want to go to Italy". The information processing apparatus 100 extracts a keyword "Italy" from the user's answer and narrows down the candidates of plan information to 35 candidates by using the extracted keyword "Italy". Subsequently, in step S22, the information processing apparatus 100 determines whether or not the user's answer obtained in step S21 includes an open question end trigger. Since the user's answer "I want to go to Italy" does not include a negative expression and the first condition is not satisfied, the process returns to step S21.

Subsequently, in step S21, the information processing apparatus 100 outputs "Any other conditions?" as a second open question about the target of search with reference to FIG. 10B, and the user answers "I want to stay there for 5 nights". The information processing apparatus 100 extracts a keyword "5 nights" from the user's answer and narrows down the candidates of plan information to 8 candidates by using the extracted keyword "5 nights". Subsequently, in step S22, the information processing apparatus 100 determines whether or not the user's answer obtained in step S21 includes an open question end trigger. Since the user's answer "I want to stay there for 5 nights" does not include a negative expression, the process returns to step S21 again.

Subsequently, in step S21, the information processing apparatus 100 outputs "Any other conditions?" as a third open question about the target of search with reference to FIG. 10B, and the user answers "No". The information processing apparatus 100 obtains, from the user's answer, an understanding result indicating that the answer includes a negative expression. Subsequently, in step S22, the information processing apparatus 100 determines that the user's answer obtained in step S21 includes a negative expression and an open question end trigger. Accordingly, the information processing apparatus 100 quits the open-question loop (step S20) and proceeds to the process of the closed-question loop (step S30).

Subsequently, as shown in the display screen D33, the information processing apparatus 100 selects a closed question "Would you like condition X?" with reference to FIG. 10B in step S31 and selects "2 persons" as a keyword to replace condition X by referring to the task data 131 illustrated in FIG. 10A. In this way, the information processing apparatus 100 outputs "Would you like a plan for 2 persons?" as a closed question about the target of search, and the user answers "Yes". The information processing apparatus 100 extracts a keyword "2 persons" from the user's answer and understands that the extracted keyword "2 persons" is a positive keyword. The information processing apparatus 100 narrows down the candidates of plan information to 4 candidates by using the extracted keyword "2 persons". Subsequently, in step S32, the information processing apparatus 100 determines whether or not the user's answer obtained in step S31 includes a closed question end trigger. For example, the number of candidates of plan information that have been narrowed down by using the user's answer is 4, which is not equal to or less than 1 as a predetermined value, and thus the second condition is not satisfied. Accordingly, the process returns to step S31.

Subsequently, in step S31, the information processing apparatus 100 outputs "Would you like a plan that costs 100 thousand yen or less?" as a closed question about the target of search by using a method similar to that described above, and the user answers "Yes". The information processing apparatus 100 extracts a keyword "100 thousand yen or less" from the user's answer and understands that the extracted keyword "100 thousand yen or less" is a positive keyword. The information processing apparatus 100 narrows down the candidates of plan information to 2 candidates by using the extracted keyword "100 thousand yen or less". Subsequently, in step S32, the number of candidates of plan information that have been narrowed down by using the user's answer obtained in step S31 is 2, which is not equal to or less than 1 as the predetermined value, and thus the information processing apparatus 100 returns to step S31 again.

Subsequently, in step S31, the information processing apparatus 100 outputs "Would you like a plan with free time?" as a closed question about the target of search by using a method similar to that described above, and the user answers "No". The information processing apparatus 100 extracts a keyword "with free time" from the user's answer and understands that the extracted keyword "with free time" is a negative keyword. The information processing apparatus 100 narrows down the candidates of plan information to 1 candidate by using the extracted keyword "with free time". Subsequently, in step S32, the number of candidates of plan information that have been narrowed down by using the user's answer is 1, which is equal to 1 as the predetermined value, and thus the second condition is satisfied. Accordingly, the information processing apparatus 100 determines that there is a closed question end trigger. In this way, the information processing apparatus 100 quits the closed-question loop (step S30) and proceeds to step S40.

Finally, in step S40, the information processing apparatus 100 outputs a conclusion "Here is plan 2", and the conclusion is presented to the user.

Example 4

In Example 4, a description will be given of the case of performing, as a task of performing narrowing down regarding information that a user desires to search for, a task of performing narrowing down to find one or more real estate properties satisfying a plurality of conditions. That is, a description will be given of a case where a target of search is a plurality of real estate properties, an open question as a first-type question is a question asking a condition for narrowing down the plurality of real estate properties, and a closed question as a second-type question is a question asking whether or not to request one of conditions for narrowing down the plurality of real estate properties.

Figures 12A, 12B:
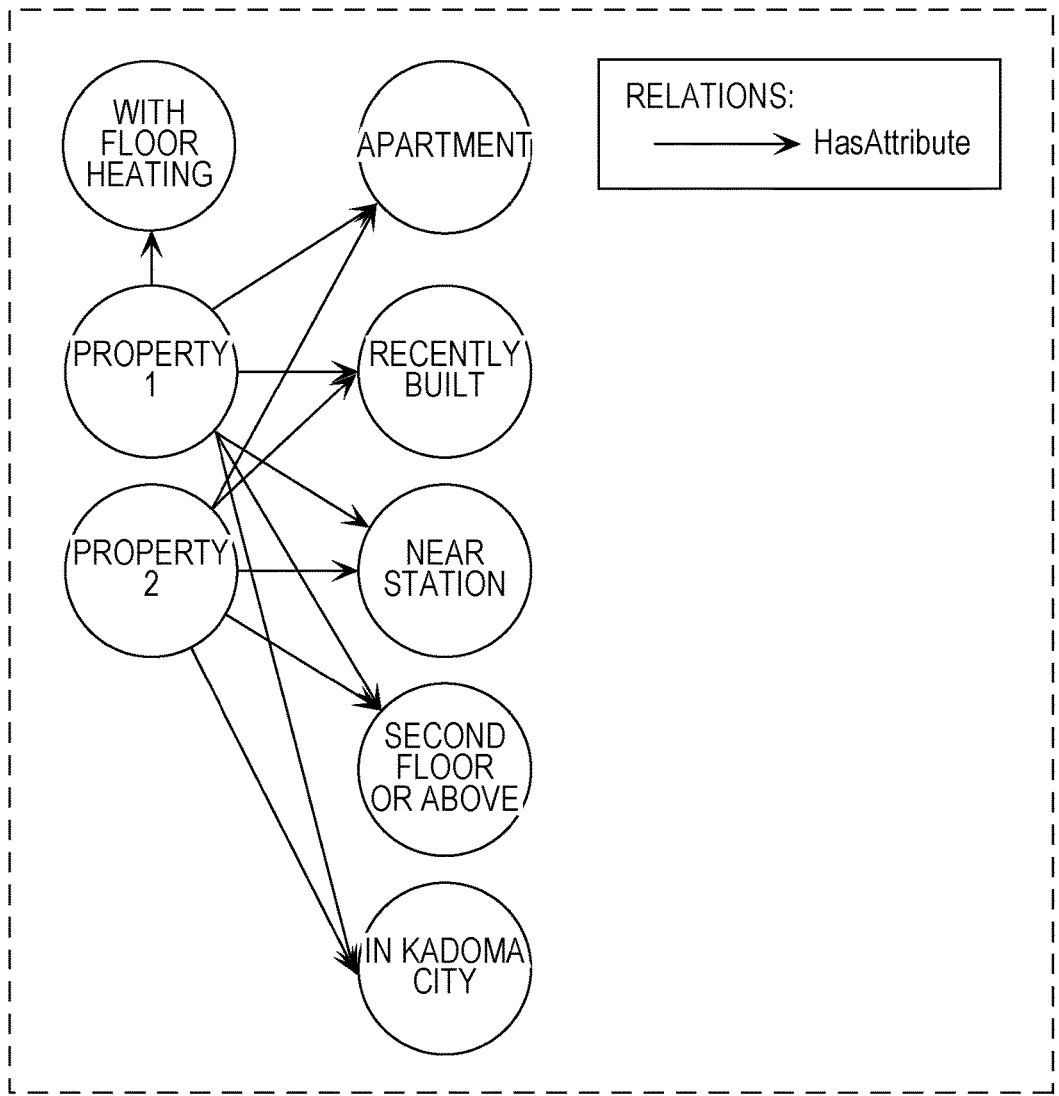
FIG. 12A is a diagram illustrating an example of task data according to Example 4 of the first embodiment.
FIG. 12B is a diagram illustrating an example of sentence generation data according to Example 4 of the first embodiment.

FIG. 12A is a diagram illustrating an example of the task data 131 according to Example 4 of the first embodiment. FIG. 12A illustrates, as an example of the task data 131, a knowledge base in which the relations between real estate properties and conditions are expressed in the form of a digraph. FIG. 12A corresponds to illustration of a part of a huge knowledge base.

In the example illustrated in FIG. 12A, properties 1 and 2 correspond to a plurality of candidates as a target of search, and apartment, recently built, near station, and so forth correspond to element information (keywords). In addition, FIG. 12A illustrates a relation in which "property 1" in node 1 satisfies the conditions in node 2 including apartment, recently built, near station, second floor or above, and with floor heating, and a relation in which "apartment" in node 2 relates to another real estate property in node 1, such as property 2, satisfying a condition of being near the station. To represent these relations, a relation sign "HasAttribute" is applied.

Thus, node 2 in [node 1 HasAttribute node 2] is regarded as a keyword, node 1 linked thereto is regarded as a target to be searched for, and the keywords of AND search of a plurality of keywords are increased, so that information satisfying a plurality of conditions can be found through narrowing down. In this way, real estate properties can be narrowed down on the basis of a plurality of conditions.

FIG. 12B is a diagram illustrating an example of the sentence generation data 132 according to Example 4 of the first embodiment. FIG. 12B illustrates an example of templates of open questions and a template of a closed question, which are referred to by the information processing apparatus 100.

That is, in a case where the information processing apparatus 100 outputs an open question about a target of search, the information processing apparatus 100 generates a question sentence "What kind of property are you looking for?" as a first open question illustrated in FIG. 12B at the beginning of interaction with the user, and then (repeatedly) generates a question sentence "Any other conditions?" as a second or later open question illustrated in FIG. 12B.

In a case where the information processing apparatus 100 outputs a closed question about a target of search, the information processing apparatus 100 outputs a closed question "Do you prefer condition X?" illustrated in FIG. 12B by using one template that is the same regardless of a condition. The part "condition X" is replaced with one of the keywords indicated in node 2 of the task data 131 illustrated in FIG. 12A. "Condition X" may be replaced with one keyword selected each time as a keyword that is effective for narrowing down among the keywords indicated in node 2 that are obtained by referring to the task data 131 by the information processing apparatus 100.

Figure 13:
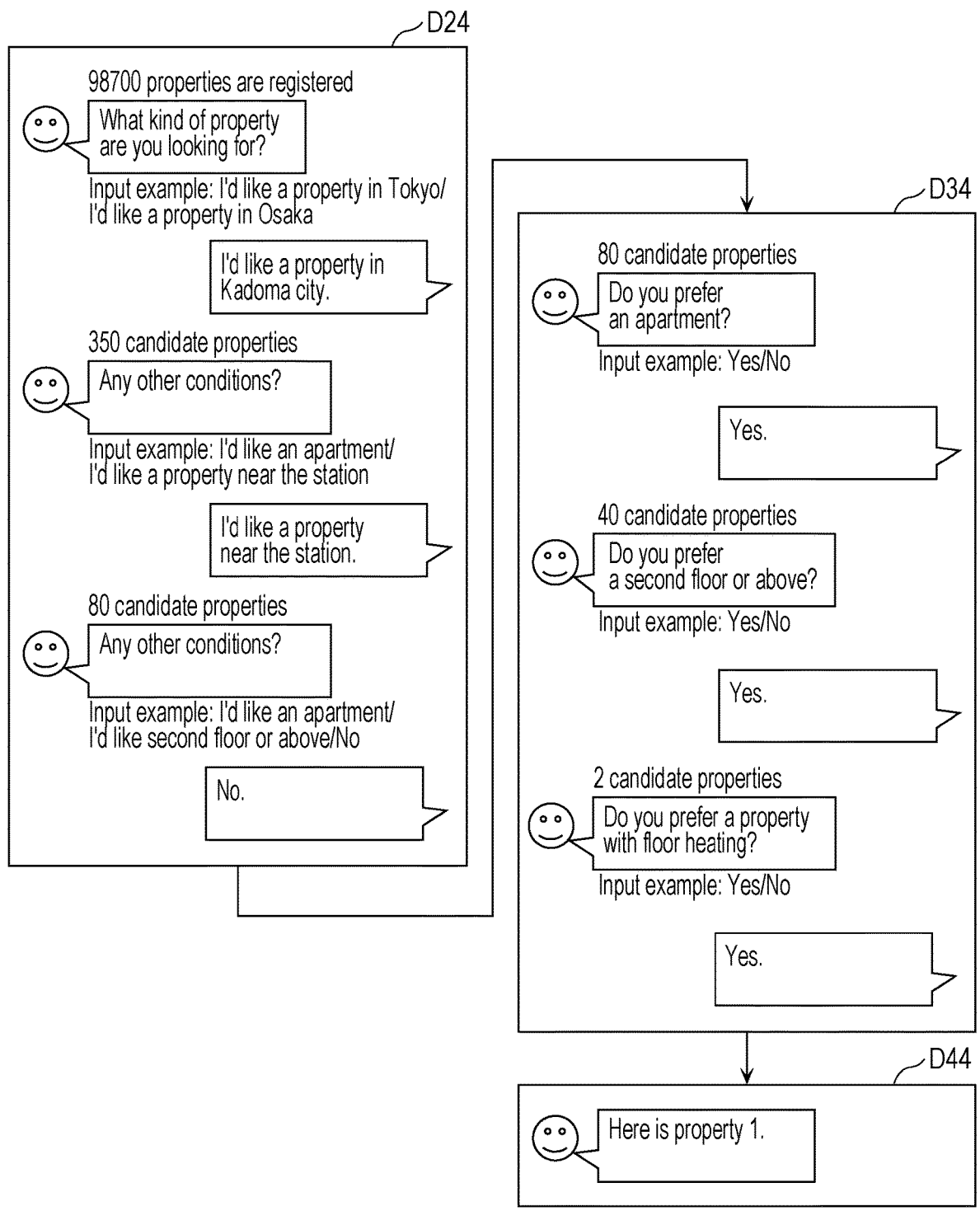
FIG. 13 is a diagram illustrating an example of display screens according to Example 4 of the first embodiment.

FIG. 13 is a diagram illustrating an example of display screens according to Example 4 of the first embodiment. A display screen D24 shows an example of interaction in the process of the open-question loop in step S20, and a display screen D34 shows an example of interaction in the process of the closed-question loop in step S30. A display screen D44 shows an example of a conclusion presented in step S40.

Hereinafter, a description will be given in accordance with the processes illustrated in FIGS. 4 and 5.

It is assumed that the number of candidates of real estate properties, that is, candidates of property information, registered as a target of search in an initial state is 98700.

In this case, as shown in the display screen D24, the information processing apparatus 100 first outputs "What kind of property are you looking for?" as a first open question about the target of search with reference to FIG. 12B in step S21, and the user answers "I'd like a property in Kadoma city", The information processing apparatus 100 extracts a keyword "in Kadoma city" from the user's answer and narrows down the candidates of property information to 350 candidates by using the extracted keyword "in Kadoma city". Subsequently, in step S22, the information processing apparatus 100 determines whether or not the user's answer obtained in step S21 includes an open question end trigger. Since the user's answer "I'd like a property in Kadoma city" does not include a negative expression and the first condition is not satisfied, the process returns to step S21.

Subsequently, in step S21, the information processing apparatus 100 outputs "Any other conditions?" as a second open question about the target of search with reference to FIG. 12B, and the user answers "I'd like a property near the station". The information processing apparatus 100 extracts a keyword "near the station" from the user's answer and narrows down the candidates of property information to 80 candidates by using the extracted keyword "near the station". Subsequently, in step S22, the information processing apparatus 100 determines whether or not the user's answer obtained in step S21 includes an open question end trigger. Since the user's answer "I'd like a property near the station" does not include a negative expression, the process returns to step S21 again.

Subsequently, in step S21, the information processing apparatus 100 outputs "Any other conditions?" as a third open question about the target of search with reference to FIG. 12B, and the user answers "No". The information processing apparatus 100 obtains, from the user's answer, an understanding result indicating that the answer includes a negative expression. Subsequently, in step S22, the information processing apparatus 100 determines that the user's answer obtained in step S21 includes a negative expression and an open question end trigger. Accordingly, the information processing apparatus 100 quits the open-question loop (step S20) and proceeds to the process of the closed-question loop (step 330).

Subsequently, as shown in the display screen D34, the information processing apparatus 100 selects a closed question "Do you prefer condition X?" with reference to FIG. 12B in step S31 and selects "apartment" as a keyword to replace condition X by referring to the task data 131 illustrated in FIG. 12A. In this way, the information processing apparatus 100 outputs "Do you prefer an apartment?" as a closed question about the target of search, and the user answers "Yes". The information processing apparatus 100 extracts a keyword "apartment" from the user's answer and understands that the extracted keyword "apartment" is a positive keyword. The information processing apparatus 100 narrows down the candidates of property information to 40 candidates by using the extracted keyword "apartment". Subsequently, in step S32, the information processing apparatus 100 determines whether or not the user's answer obtained in step S31 includes a closed question end trigger. For example, the number of candidates of property information that have been narrowed down by using the user's answer is 40, which is not equal to or less than 1 as a predetermined value, and thus the second condition is not satisfied. Accordingly, the process returns to step S31.

Subsequently, in step S31, the information processing apparatus 100 outputs "Do you prefer a second floor or above?" as a closed question about the target of search by using a method similar to that described above, and the user answers "Yes". The information processing apparatus 100 extracts a keyword "second floor or above" from the user's answer and understands that the extracted keyword "second floor or above" is a positive keyword. The information processing apparatus 100 narrows down the candidates of property information to 2 candidates by using the extracted keyword "second floor or above". Subsequently, in step S32, the number of candidates of property information that have been narrowed down by using the user's answer obtained in step S31 is 2, which is not equal to or less than 1 as the predetermined value, and thus the information processing apparatus 100 returns to step S31 again.

Subsequently, in step S31, the information processing apparatus 100 outputs "Do you prefer a property with floor heating?" as a closed question about the target of search by using a method similar to that described above, and the user answers "Yes". The information processing apparatus 100 extracts a keyword "with floor heating" from the user's answer and understands that the extracted keyword "with floor heating" is a positive keyword. The information processing apparatus 100 narrows down the candidates of property information to 1 candidate by using the extracted keyword "with floor heating". Subsequently, in step S32, the number of candidates of property information that have been narrowed down by using the user's answer is 1, which is equal to 1 as the predetermined value, and thus the second condition is satisfied. Accordingly, the information processing apparatus 100 determines that there is a closed question end trigger. In this way, the information processing apparatus 100 quits the closed-question loop (step S30) and proceeds to step S40.

Finally, in step S40, the information processing apparatus 100 outputs a conclusion "Here is property 1", and the conclusion is presented to the user.

Example 5

In Example 5, a description will be given of the case of performing, as a task of performing narrowing down regarding information that a user desires to search for, a task of performing narrowing down to find one or more video content items satisfying a plurality of conditions. That is, a description will be given of a case where a target of search is a plurality of video content items, an open question as a first-type question is a question asking a condition for narrowing down the plurality of video content items, and a closed question as a second-type question is a question asking whether or not to request one of conditions for narrowing down the plurality of video content items.

Figures 14A, 14B:
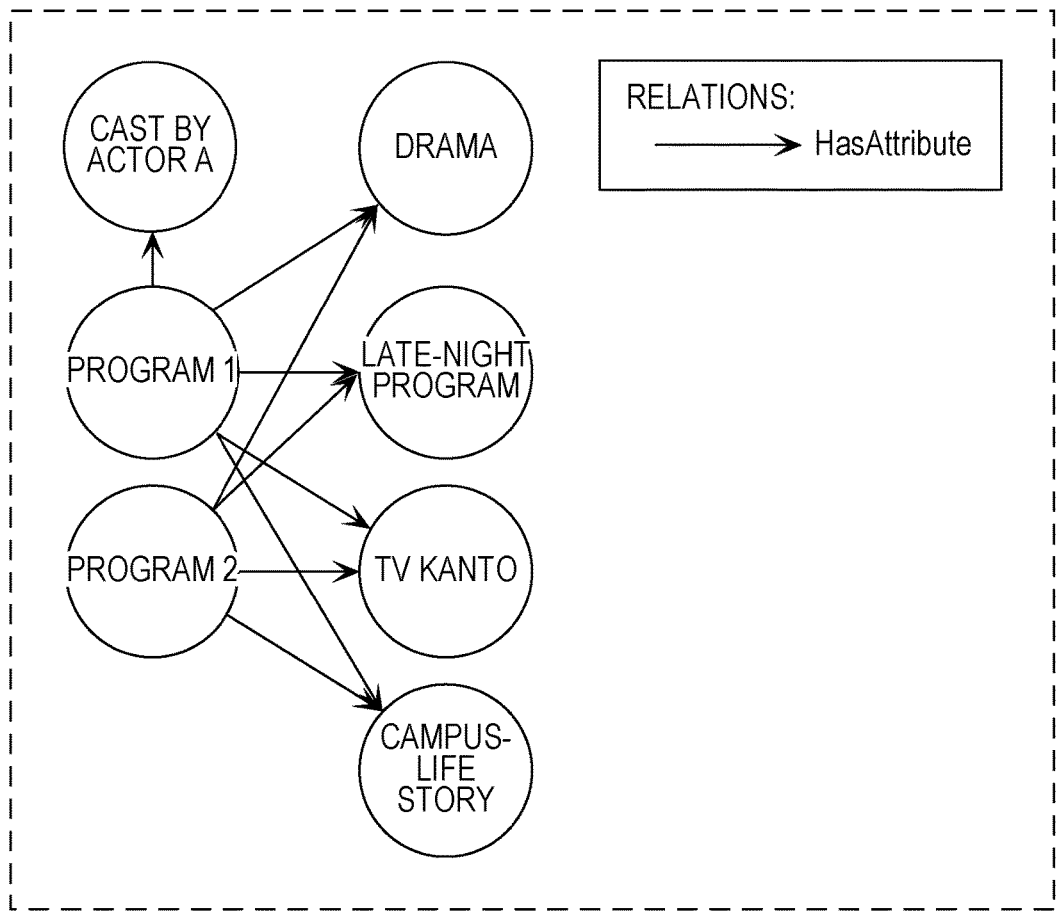
FIG. 14A is a diagram illustrating an example of task data according to Example 5 of the first embodiment.
FIG. 14B is a diagram illustrating an example of sentence generation data according to Example 5 of the first embodiment.

FIG. 14A is a diagram illustrating an example of the task data 131 according to Example 5 of the first embodiment. FIG. 14A illustrates, as an example of the task data 131, a knowledge base in which the relations between video content items and conditions are expressed in the form of a digraph. FIG. 14A corresponds to illustration of a part of a huge knowledge base.

In the example illustrated in FIG. 14A, programs 1 and 2 correspond to a plurality of candidates as a target of search, and drama, late-night program, TV Kanto, and so forth correspond to element information (keywords). In addition, FIG. 14A illustrates a relation in which "program 1" in node 1 satisfies the conditions in node 2 including cast by actor A, drama, late-night program, TV Kanto, and campus-life story, and a relation in which "drama" in node 2 relates to another video content item in node 1, such as program 2, satisfying a condition of a campus-life story. To represent these relations, a relation sign "HasAttribute" is applied.

Thus, node 2 in [node 1 HasAttribute node 2] is regarded as a keyword, node 1 linked thereto is regarded as a target to be searched for, and the keywords of AND search of a plurality of keywords are increased, so that information satisfying a plurality of conditions can be found through narrowing down. In this way, video content items can be narrowed down on the basis of a plurality of conditions.

FIG. 14B is a diagram illustrating an example of the sentence generation data 132 according to Example 5 of the first embodiment. FIG. 14B illustrates an example of templates of open questions and a template of a closed question, which are referred to by the information processing apparatus 100.

That is, in a case where the information processing apparatus 100 outputs an open question about a target of search, the information processing apparatus 100 generates a question sentence "What kind of program are you looking for?" as a first open question illustrated in FIG. 14B at the beginning of interaction with the user, and then (repeatedly) generates a question sentence "Any other conditions?" as a second or later open question illustrated in FIG. 14B.

In a case where the information processing apparatus 100 outputs a closed question about a target of search, the information processing apparatus 100 outputs a closed question "Would you like condition X?" illustrated in FIG. 14B by using one template that is the same regardless of a condition. The part "condition X" is replaced with one of the keywords indicated in node 2 of the task data 131 illustrated in FIG. 14A. "Condition X" may be replaced with one keyword selected each time as a keyword that is effective for narrowing down among the keywords indicated in node 2 that are obtained by referring to the task data 131 by the information processing apparatus 100.

Figure 15:
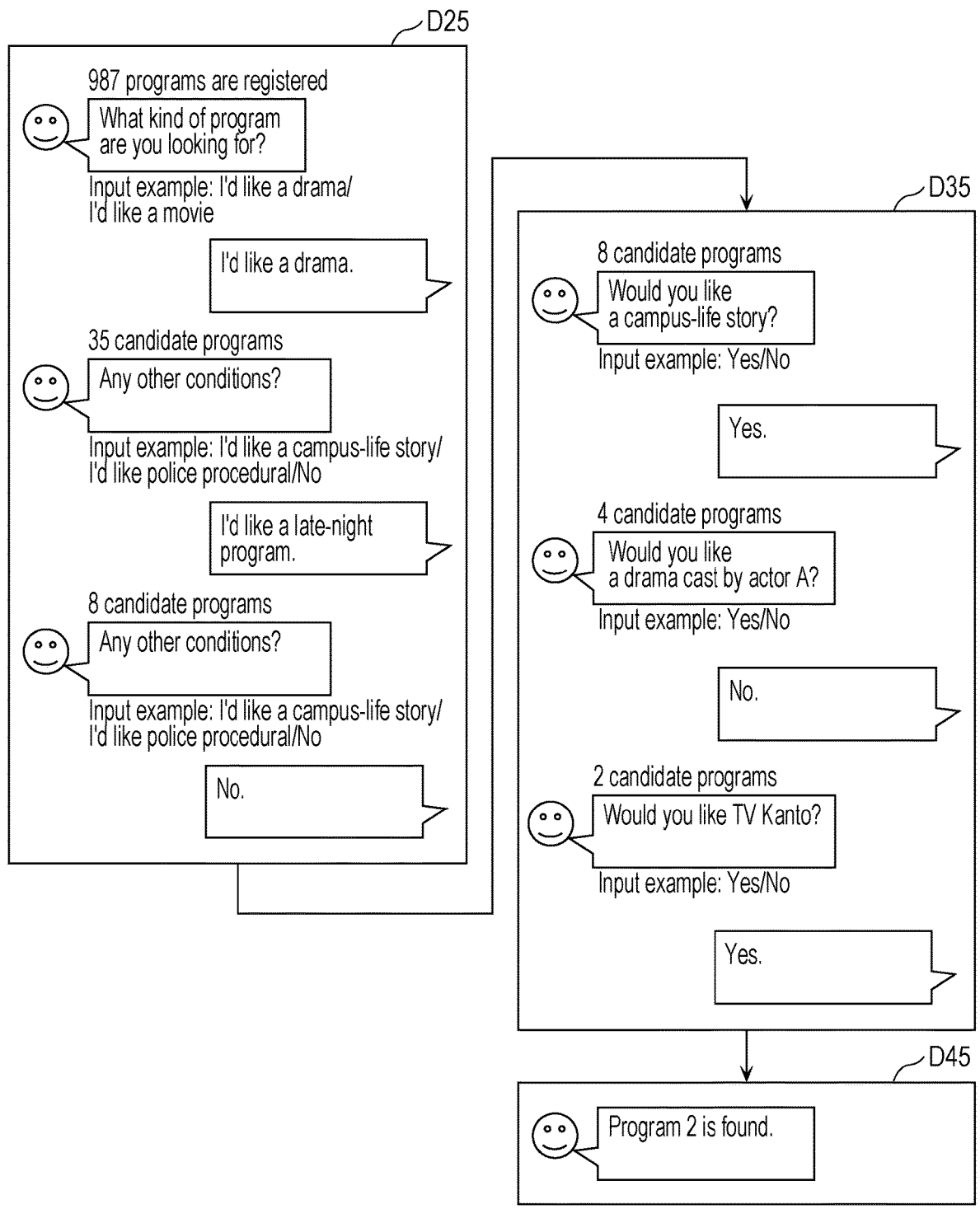
FIG. 15 is a diagram illustrating an example of display screens according to Example 5 of the first embodiment.

FIG. 15 is a diagram illustrating an example of display screens according to Example 5 of the first embodiment. A display screen D25 shows an example of interaction in the process of the open-question loop in step S20, and a display screen D35 shows an example of interaction in the process of the closed-question loop in step S30. A display screen D45 shows an example of a conclusion presented in step S40.

Hereinafter, a description will be given in accordance with the processes illustrated in FIGS. 4 and 5.

It is assumed that the number of candidates of video content items, that is, candidates of program information, registered as a target of search in an initial state is 987.

In this case, as shown in the display screen D25, the information processing apparatus 100 first outputs "What kind of program are you looking for?" as a first open question about the target of search with reference to FIG. 14B in step S21, and the user answers "I'd like a drama". The information processing apparatus 100 extracts a keyword "drama" from the user's answer and narrows down the candidates of program information to 35 candidates by using the extracted keyword "drama". Subsequently, in step S22, the information processing apparatus 100 determines whether or not the users answer obtained in step S21 includes an open question end trigger. Since the user's answer "I'd like a drama" does not include a negative expression and the first condition is not satisfied, the process returns to step S21.

Subsequently, in step S21, the information processing apparatus 100 outputs "Any other conditions?" as a second open question about the target of search with reference to FIG. 14B, and the user answers "I'd like a late-night program". The information processing apparatus 100 extracts a keyword "late-night program" from the user's answer and narrows down the candidates of program information to 80 candidates by using the extracted keyword "late-night program". Subsequently, in step S22, the information processing apparatus 100 determines whether or not the user's answer obtained in step S21 includes an open question end trigger. Since the user's answer "I'd like a late-night program" does not include a negative expression, the process returns to step S21 again.

Subsequently, in step S21, the information processing apparatus 100 outputs "Any other conditions?" as a third open question about the target of search with reference to FIG. 14B, and the user answers "No". The information processing apparatus 100 obtains, from the users answer, an understanding result indicating that the answer includes a negative expression. Subsequently, in step S22, the information processing apparatus 100 determines that the user's answer obtained in step S21 includes a negative expression and an open question end trigger. Accordingly, the information processing apparatus 100 quits the open-question loop (step S20) and proceeds to the process of the closed-question loop (step S30).

Subsequently, as shown in the display screen D35, the information processing apparatus 100 selects a closed question "Would you like condition X?" with reference to FIG. 14B in step S31 and selects "campus-life story" as a keyword to replace condition X by referring to the task data 131 illustrated in FIG. 14A. In this way, the information processing apparatus 100 outputs "Would you like a campus-life story?" as a closed question about the target of search, and the user answers "Yes". The information processing apparatus 100 extracts a keyword "campus-life story" from the user's answer and understands that the extracted keyword "campus-life story" is a positive keyword. The information processing apparatus 100 narrows down the candidates of program information to 4 candidates by using the extracted keyword "campus-life story". Subsequently, in step S32, the information processing apparatus 100 determines whether or not the user's answer obtained in step S31 includes a closed question end trigger. For example, the number of candidates of program information that have been narrowed down by using the user's answer is 4, which is not equal to or less than 1 as a predetermined value, and thus the second condition is not satisfied. Accordingly, the process returns to step 331.

Subsequently, in step S31, the information processing apparatus 100 outputs "Would you like a drama cast by actor A?" as a closed question about the target of search by using a method similar to that described above, and the user answers "No". The information processing apparatus 100 extracts a keyword "cast by actor A" from the user's answer and understands that the extracted keyword "cast by actor A" is a negative keyword. The information processing apparatus 100 narrows down the candidates of program information to 2 candidates by using the extracted keyword "cast by actor A". Subsequently, in step S32, the number of candidates of program information that have been narrowed down by using the user's answer obtained in step 331 is 2, which is not equal to or less than 1 as the predetermined value, and thus the information processing apparatus 100 returns to step S31 again.

Subsequently, in step S31, the information processing apparatus 100 outputs "Would you like TV Kanto?" as a closed question about the target of search by using a method similar to that described above, and the user answers "Yes". The information processing apparatus 100 extracts a keyword "TV Kanto" from the user's answer and understands that the extracted keyword "TV Kanto" is a positive keyword. The information processing apparatus 100 narrows down the candidates of program information to 1 candidate by using the extracted keyword "TV Kanto", Subsequently, in step S32, the number of candidates of program information that have been narrowed down by using the user's answer is 1, which is equal to 1 as the predetermined value, and thus the second condition is satisfied. Accordingly, the information processing apparatus 100 determines that there is a closed question end trigger. In this way, the information processing apparatus 100 quits the closed-question loop (step S30) and proceeds to step S40.

Finally, in step S40, the information processing apparatus 100 outputs a conclusion "Program 2 is found", and the conclusion is presented to the user.

Advantages

As described above, the information processing apparatus and so forth according to the first embodiment are capable of sufficiently obtaining conditions about information that a user desires to search for.

More specifically, the information processing apparatus and so forth according to the first embodiment constantly generate a question to a user and thereby taking the initiative in a flow of interaction, that is, performing system-led interaction control. To perform narrowing down regarding information that the user desires to search for, the apparatus starts with an open question and repeats an open question until narrowing-down conditions have been presented through user's utterance. Accordingly, the user can freely speak and does not feel dissatisfaction about the interaction, and narrowing-down conditions can be sufficiently obtained through user's utterance. In addition, a closed question given thereafter is repeated until narrowing down is sufficiently performed to find the information that the user desires to search for, and thus conditions about the information that the user desires to search for can be sufficiently obtained. Accordingly, candidates for a target that the user desires to search for can be reliably narrowed down and presented.

The condition in which the process proceeds to step S40 after sufficient narrowing down is performed in step S30 may also be applied to step S20.

Second Embodiment

In the first embodiment, a description has been given under the assumption that a keyword extracted from a user's answer to an open question is included in the database 13, but the embodiment is not limited thereto. Hereinafter, a description will be given of, as a second embodiment, a case where sometimes a keyword extracted from a user's answer to an open question is not included in the database 13, A description of the same points as those of the first embodiment will be omitted, and a description will be given mainly of a difference from the first embodiment. Regarding the same figures as those of the first embodiment, the figures applied to the first embodiment are used.

Configuration of Information Processing Apparatus 100A

Figure 16:
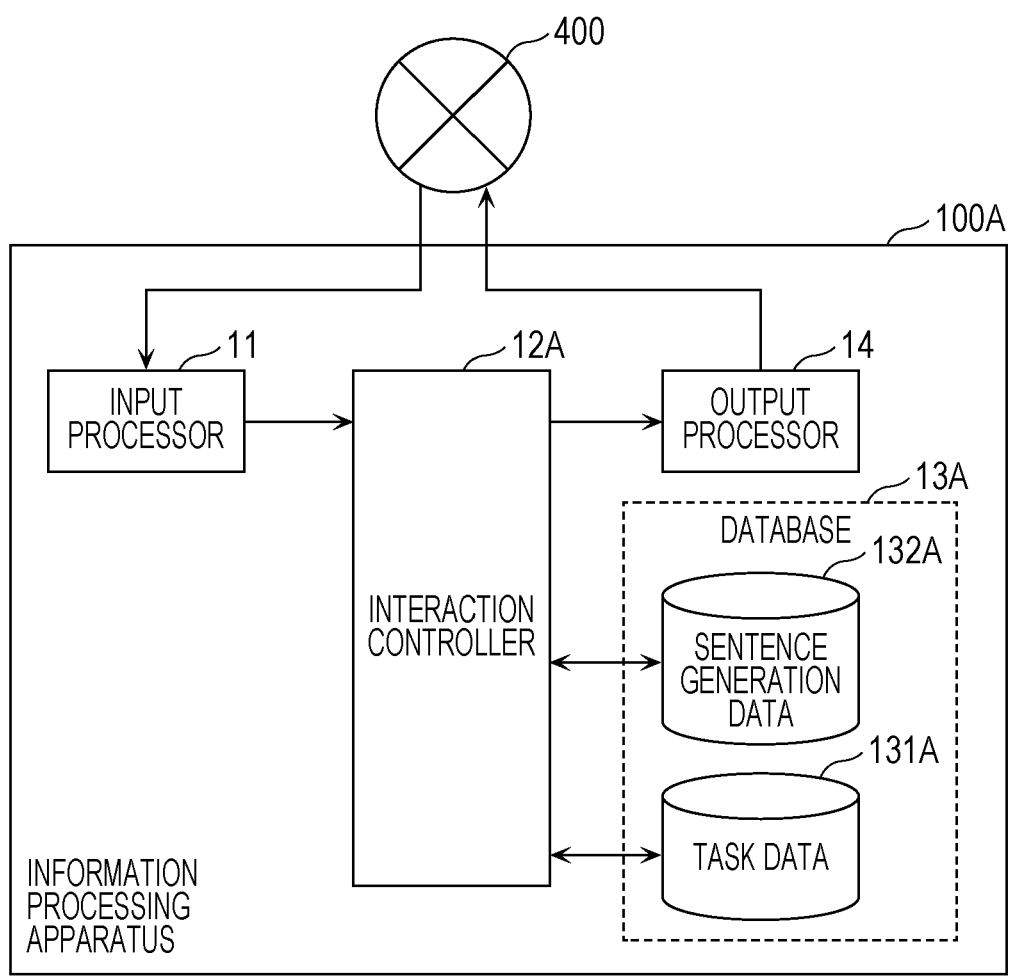
FIG. 16 is a block diagram illustrating an example configuration of an information processing apparatus according to a second embodiment.

FIG. 16 is a block diagram illustrating an example configuration of an information processing apparatus 100A according to the second embodiment.

The information processing apparatus 100A according to the second embodiment is different from the information processing apparatus 100 according to the first embodiment in the configurations of an interaction controller 12A and a database 13A.

Interaction Controller 12A

The interaction controller 12A has a function of deciding on an output sentence, which is a question or answer to the user, by using an understanding result output from the input processor 11 and the database 13A. The interaction controller 12A also has, in addition to the function of deciding on an output sentence, a function of managing the number of candidates for information desired by the user, that is, information that the user desires to search for, and managing management information, which is information to be presented as an example of a user's response to the output sentence that has been decided on.

In the second embodiment, if a keyword included in a user's answer, which is an understanding result output from the input processor 11, is not included in task data 131A, the interaction controller 12A decides on an output sentence, which is a question sentence for acquiring knowledge related to the keyword.

More specifically, if the interaction controller 12A determines that an answer to a first-type question obtained by the input processor 11 does not satisfy the first condition and that, based on the database 13A storing information about a target of search, a word or phrase corresponding to a word or phrase (keyword) included in the answer is not included in the database 13A, the interaction controller 12A causes the output processor 14 to output a first-type question for requesting an explanation about the word or phrase (keyword) included in the answer and not included in the database 13A. Here, the explanation about the word or phrase included in the answer and not included in the database 13A is a knowledge-acquisition question, and is a question including one of specific examples of a target of search.

On the other hand, if the interaction controller 12A determines that the answer to the first-type question obtained by the input processor 11 does not satisfy the first condition and that a word or phrase corresponding to the word or phrase (keyword) included in the answer is included in the database 13A, the interaction controller 12A causes the output processor 14 to output a first-type question about the target of search.

Also, the interaction controller 12A registers, in the database 13A, information that is based on an answer to the question that is input by the user and obtained by the input processor 11.

As described above, the interaction controller 12A according to the second embodiment additionally has a determination function of determining whether or not a word or phrase corresponding to a word or phrase (keyword) included in answer to a first-type question obtained by the input processor 11 is included in the database 13A. Furthermore, the interaction controller 12A additionally has a storage function of additionally storing, in the database 13A, a keyword or the like which is information included in an answer to a question for acquiring a keyword or knowledge. Note that the determination function does not necessarily determine whether or not an answer to a first-type question obtained by the input processor 11 satisfies the first condition.

Database 13A

In the second embodiment, the database 13A includes the task data 131A and sentence generation data 132A that is referred to for generating a sentence, as illustrated in FIG. 16.

The task data 131A is an example of a knowledge base as in the first embodiment, but also stores knowledge acquired by using a question sentence for acquiring knowledge. Other than that, the task data 131A is the same as the task data 131 according to the first embodiment and thus the description thereof is omitted.

The sentence generation data 132A stores templates of questions for acquiring knowledge in addition to templates of open questions and templates of closed questions that are referred to by the interaction controller 12A.

Process in Information Processing Apparatus 100A

Next, a process performed in the information processing apparatus 100A having the above-described configuration will be described.

Figure 17A:
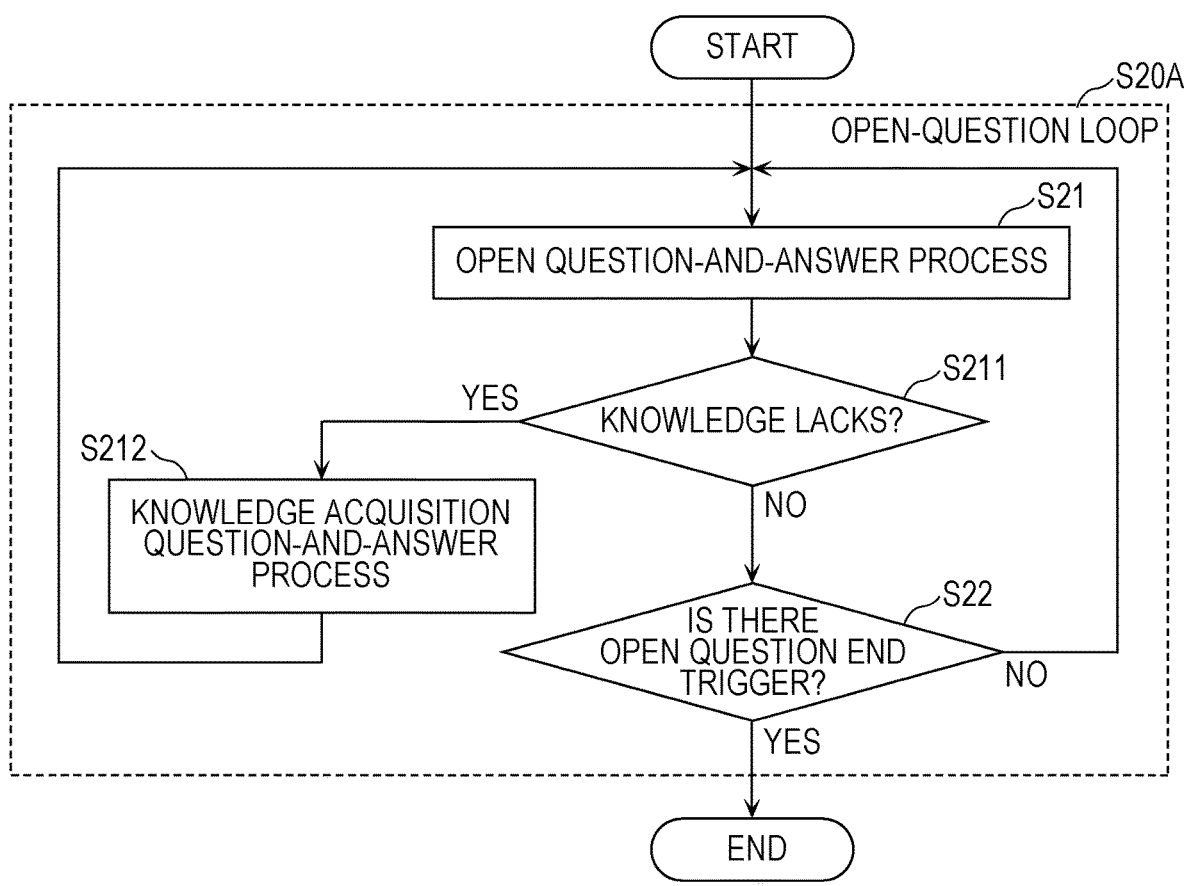
FIG. 17A is a flowchart illustrating an example of the details of an open-question loop according to the second embodiment.

FIG. 17A is a flowchart illustrating an example of the details of an open-question loop according to the second embodiment. FIG. 17A illustrates an example of the details of step S20 in FIG. 3 and corresponds to the flowchart illustrated in FIG. 4 added with a process of a question for acquiring knowledge. The same steps as those in FIG. 4 are denoted by the same reference signs, and the detailed description thereof will be omitted.

In the process of the open-question loop (step S20A) illustrated in FIG. 17A, the information processing apparatus 100A first performs an open question-and-answer process of outputting an open question about a target of search and obtaining and understanding a user's answer to the question in step S21.

Here, since the question output in step S21 is an open question, the answer thereto is decided on by the user. Thus, there is a possibility that an answer unpredicted by the information processing apparatus 100A may be given. That is, the information processing apparatus 100A expects to extract a keyword registered in the task data 131A in advance, but the user does not know the keywords registered therein. The user makes an answer on the basis of his/her thinking, and thus there is a possibility that a keyword extracted by the information processing apparatus 100A does not correspond to a keyword registered in the task data 131A in advance.

Subsequently, the information processing apparatus 100A determines in step S211 whether or not knowledge lacks. If a keyword included in an understanding result of the user's question in step S21 does not correspond to a keyword registered in the task data 131A, the information processing apparatus 100A determines that knowledge lacks (YES in step S211) and the process proceeds to step S212. Otherwise (NO in step S211), the process proceeds to step S22.

Subsequently, in step S212, the information processing apparatus 100A performs a knowledge acquisition question-and-answer process. More specifically, the information processing apparatus 100A outputs an open question for requesting an explanation about the keyword included in the answer and not included in the task data 131A. In other words, the information processing apparatus 100A outputs a question sentence for acquiring knowledge related to the keyword not included in the task data 131A. Subsequently, the information processing apparatus 100A adds the knowledge acquired from a user's answer to the question to the task data 131A.

In this way, the information processing apparatus 100A repeats the open question-and-answer process until the first condition is satisfied.

Figure 17B:
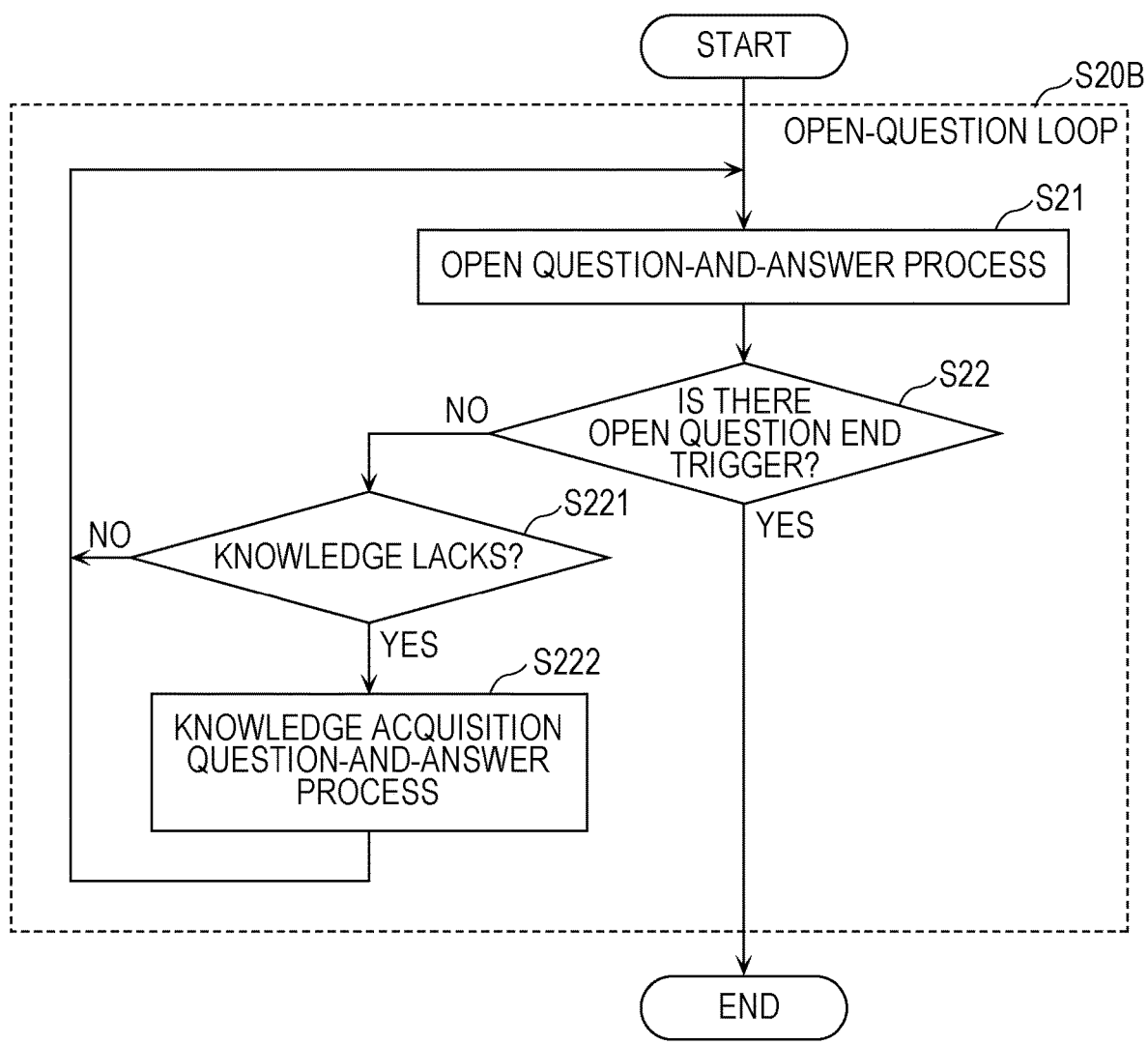
FIG. 17B is a flowchart illustrating another example of the details of the open-question loop according to the second embodiment.

FIG. 17B is a flowchart illustrating another example of the details of the open-question loop according to the second embodiment. FIG. 17B illustrates, like FIG. 17A, an example of the details of step S20 in FIG. 3, and corresponds to the flowchart illustrated in FIG. 4 added with a process of a question for acquiring knowledge. The same steps as those in FIG. 4 are denoted by the same reference signs, and the detailed description thereof will be omitted.

In the process of the open-question loop illustrated in FIG. 17B (step 320B), the information processing apparatus 100A determines whether or not the user's answer obtained in step S21 includes an open question end trigger (S22).

If the user's answer does not include a word or phrase including a negative expression in step S22 (NO in step S22), the information processing apparatus 100A determines that the first condition is not satisfied, that is, there is no open question end trigger, and determines whether or not knowledge lacks in step S221. That is, if a keyword included in an understanding result of the user's answer obtained in step S21 does not correspond to a keyword registered in the task data 131A, it is determined that knowledge lacks (YES in step S221), and the process proceeds to step S222. Otherwise (NO in step S221), the process returns to step S21.

Subsequently, the information processing apparatus 100A performs a knowledge acquisition question-and-answer process in step S222. More specifically, the information processing apparatus 100A outputs an open question for requesting an explanation about the keyword included in the answer and not included in the task data 131A. In other words, the information processing apparatus 100A outputs a question sentence for acquiring knowledge related to the keyword not included in the task data 131A. Subsequently, the information processing apparatus 100A adds the knowledge acquired from a users' answer to the question sentence to the task data 131A.

In this way, the information processing apparatus 100A repeats the open question-and-answer process until the first condition is satisfied.

Hereinafter, an example of the case of performing the knowledge acquisition question-and-answer process will be described as Example.

Example

In Example, a description will be given of the case of performing, as a task of performing narrowing down regarding information that a user desires to search for, a task of performing narrowing down to find one or more recipes satisfying a plurality of conditions. That is, a description will be given of a case where a target of search is a plurality of cooking recipes or menus, an open question as a first-type question is a question asking a condition for narrowing down the plurality of cooking recipes or menus, and a closed question as a second-type question is a question asking whether or not to request one of conditions for narrowing down the plurality of cooking recipes or menus. The same points as those in Example 2 of the first embodiment will not be described.

Figures 18A, 18B:
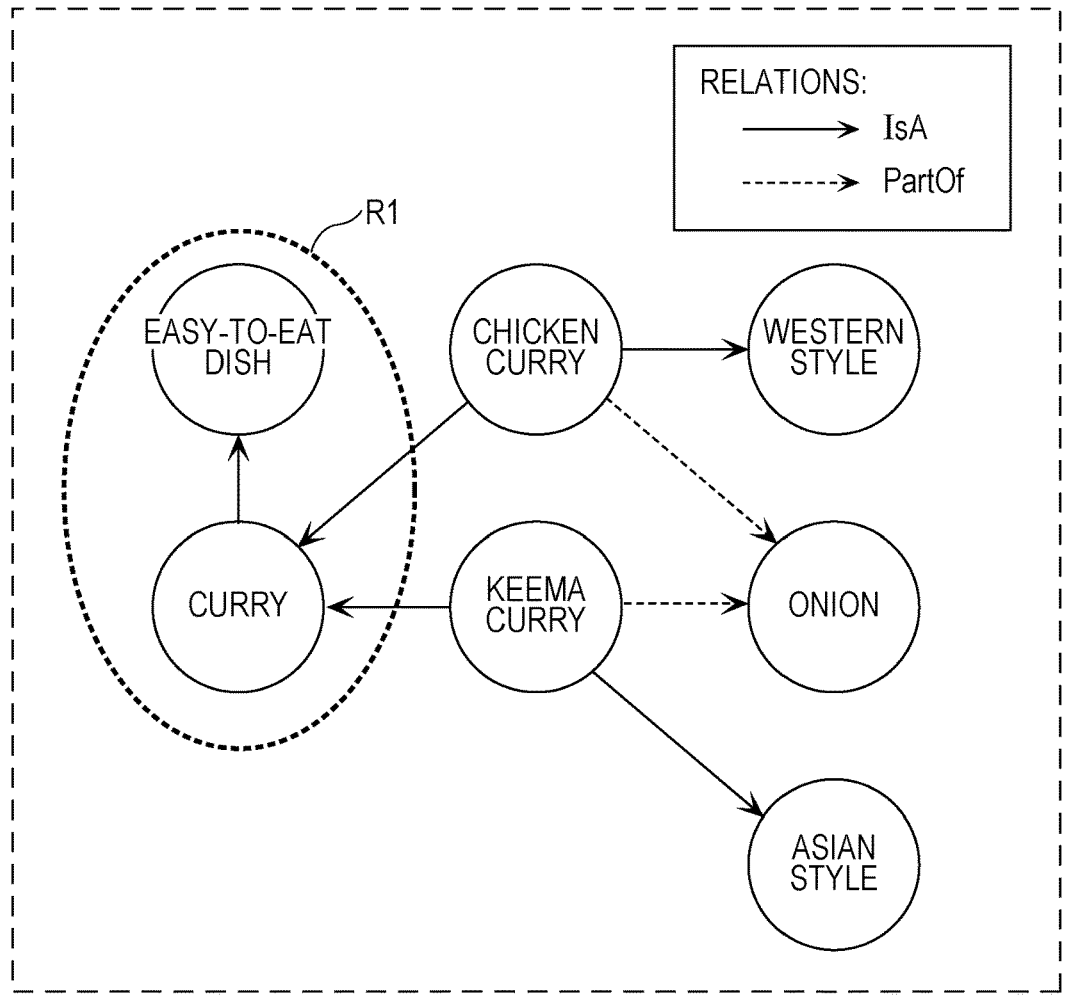
FIG. 18A is a diagram illustrating an example of task data according to Example of the second embodiment.
FIG. 18B is a diagram illustrating an example of sentence generation data according to Example of the second embodiment.

FIG. 18A is a diagram illustrating an example of the task data 131A according to Example of the second embodiment. The same points as those described above with reference to FIG. 8A will not be described. In FIG. 18A, an oval region R1 depicted with a dotted line represents the knowledge that is acquired in step S212 or step S222. The knowledge represented by the region R1 is not included in an initial state.

In the example illustrated in FIG. 18A, chicken curry and keema curry correspond to a plurality of candidates as a target of search, and Western style, onion, Again style, and so forth correspond to element information (keywords) representing a feature, attribute, condition, or the like. FIG. 18A corresponds to illustration of a part of a huge knowledge base, like FIG. 8A. The example illustrated in FIG. 18A indicates that, in an initial state, chicken curry is a Western-style dish, keema curry is an Again-style dish, and onion is used both in chicken curry and keema curry.

FIG. 18B is a diagram illustrating an example of the sentence generation data 132A according to Example of the second embodiment. FIG. 18B illustrates an example of a template of a knowledge acquisition question referred to by the interaction controller 12A, in addition to the example illustrated in FIG. 8B. The knowledge acquisition question is referred to in step S212 or step S222. In this example, a question "Could you given an example?" is output to request the user to give an example of desired information.

Figure 19:
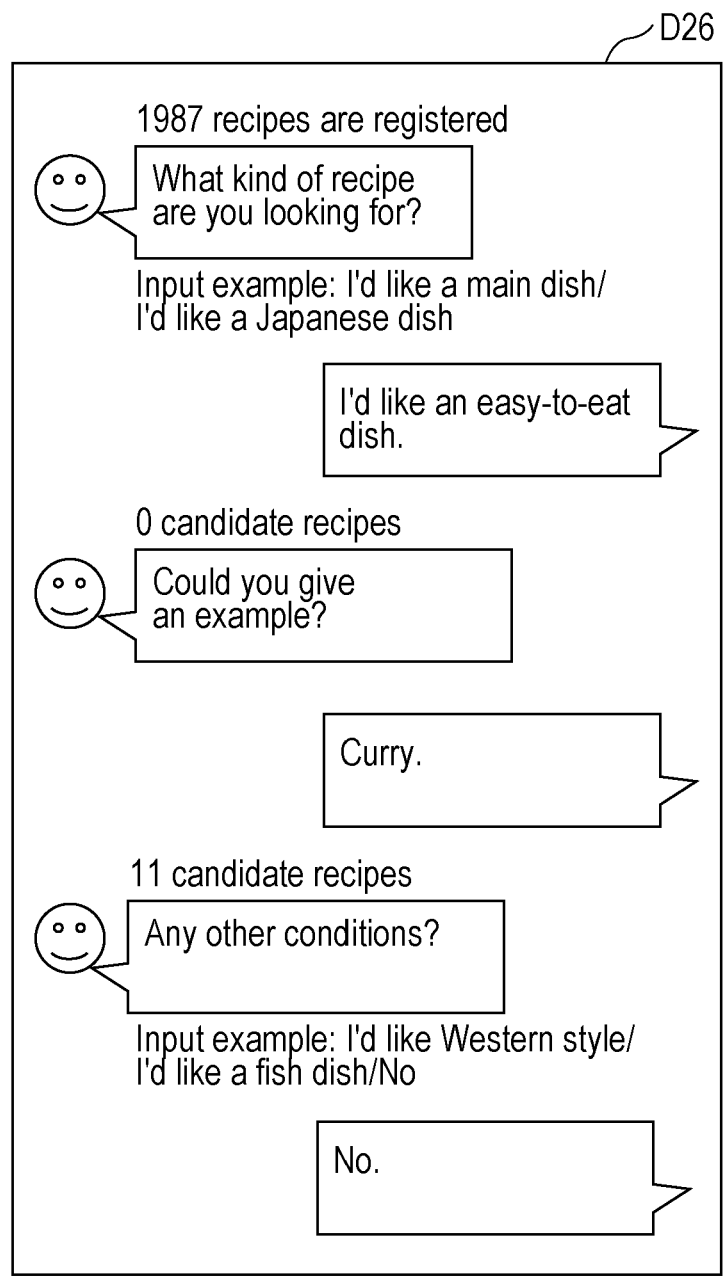
FIG. 19 is a diagram illustrating an example of a display screen according to Example of the second embodiment.

FIG. 19 is a diagram illustrating an example of a display screen D26 according to Example of the second embodiment. The display screen D26 shows an example of interaction in the process of the open-question loop in step S20A or step S20B. Hereinafter, a description will be given in accordance with the process illustrated in FIG. 17A.

It is assumed that the number of candidates of recipes or menus, that is, candidates of recipe information, registered as a target of search in an initial state is 1987.

In this case, as shown in the display screen D26, the information processing apparatus 100A first outputs "What kind of recipe are you looking for?" as a first open question about the target of search with reference to FIG. 18B in step S21, and the user answers "I'd like an easy-to-eat dish". The information processing apparatus 100A extracts a keyword "easy-to-eat dish" from the user's answer.

Subsequently, in step S211, the information processing apparatus 100A determines whether or not knowledge lacks with reference to FIG. 18A. The keyword "easy-to-eat dish" is not registered in the task data 131A, which is the knowledge database illustrated in FIG. 18A. Thus, it is determined that knowledge lacks (YES in step S211) and the process proceeds to step S212.

Subsequently, in step S212, the information processing apparatus 100A outputs "Could you give an example?" as a knowledge acquisition question with reference to FIG. 18B, and the user answers "Curry", The information processing apparatus 100A extracts a keyword "curry" from the user's answer and additionally stores the keyword, which is information included in the answer to the question for acquiring knowledge, in the task data 131A.

Now, a detailed description will be given with reference to the region R1 illustrated in FIG. 18A. The keyword obtained by the information processing apparatus 100A in step S21 is "easy-to-eat dish". This is classified as a search key, as in the case of "Western style" and the like. The keyword obtained by the information processing apparatus 100A in step S212 is "curry". This is classified as a target to be searched for, as in the case of "chicken curry" and the like.

However, the keyword "curry" is thought of by the user and does not exist in the task data 131A, which is a knowledge base. Thus, partial character string matching with targets to be searched for in the task data 131A is performed, thereby determining that "chicken curry" and "keema curry" are a kind of "curry". Generally, the name of a dish as a target to be searched for is expected to be a long name with a modifier, and the name of a dish given as an example by the user is expected to be a short name such as a general name. If necessary, morphological analysis may be performed on the name of a dish given as an example by the user to divide the name into morphemes and then partial character string matching may be performed.

In Example, "curry" given as an example by the user is determined to be a kind of dish having a feature "easy-to-eat dish", and a set of "easy-to-eat dish" and "curry" connected by "IsA" is stored in the task data 131A. Also, a set of "curry" and "chicken curry" connected by "IsA" and a set of "curry" and "keema curry" connected by "IsA" are stored in the task data 131A.

Alternatively, a set of "easy-to-eat dish" and "chicken curry" directly connected by "IsA" and a set of "easy-to-eat dish" and "keema curry" directly connected by "IsA" may be stored in the task data 131A, without using "curry". If the user provides indirect information about a feature of a dish, not direct information about the name of a dish such as "curry", matching with a search key side may be performed to search for a link to a search target, and elements connected to each other in an appropriate relation may be stored in the task data 131A.

After the acquired knowledge has been registered, the process returns to step S21.

Subsequently, in step S21, the information processing apparatus 100A outputs "Any other conditions?" as a second open question about the target of search with reference to FIG. 18B, and the user answers "No". The process performed thereafter is the same as in the display screen D22 in FIG. 9, and thus the description thereof is omitted.

Also in the display screen D26, interaction information serving as supplemental information is displayed above or below a balloon of a utterance of the system. In the example shown in the display screen D26, the numbers of candidates of recipe information are displayed above the balloons, and changes in the number from 1987 to 0 and to 11 are clearly shown. Also, input examples at individual times are shown below the balloons, and changes in the input example from "I'd like a main dish/I'd like a Japanese dish" to blank and to "I'd like Western style/I'd like a fish dish/No" are clearly shown. In this way, in the display screen D26, an utterance of the system in a colloquial expression is displayed in a balloon, whereas information related to a state of interaction is displayed in the form different from the colloquial expression above and below the balloon.

In this way, the information processing apparatus 100A presents supplemental information managed thereby as management information to the user, thereby inducing the user to utter words expected by the system, that is, the words from which the keywords stored in the task data 131A can be extracted as much as possible.

Advantages

According to the information processing apparatus and so forth of the second embodiment, even a word or phrase such as a keyword that is not included in the knowledge registered in advance in a database or the like can be newly acquired by using a knowledge acquisition question and can be reflected in the database or the like. Accordingly, even if a word or phrase such as a keyword that is not included in the knowledge registered in advance in the database or the like is included in interaction, the interaction with the user can be continued to achieve a task by using the acquired knowledge.

Accordingly, the information processing apparatus and so forth of the second embodiment is capable of sufficiently obtaining conditions about information that the user desired to search for. Thus, candidates for the target to be searched for by the user can be reliably narrowed down and presented.

As a result, the information processing apparatus and so forth of the second embodiment are capable of implementing interaction control and realizing user satisfaction through task achievement.

Third Embodiment

In the first embodiment, a description has been given under the assumption that a user's answer to a closed question includes a positive word or phrase or a negative word or phrase, but the embodiment is not limited thereto. Hereinafter, a description will be given of, as a third embodiment, a case where a user's answer to a closed question may include a question about a word or phrase included in the closed question. The same points as those in the first embodiment are not described, and a description will be given mainly of a difference from the first embodiment.

Configuration of Information Processing Apparatus 100B

Figure 20:
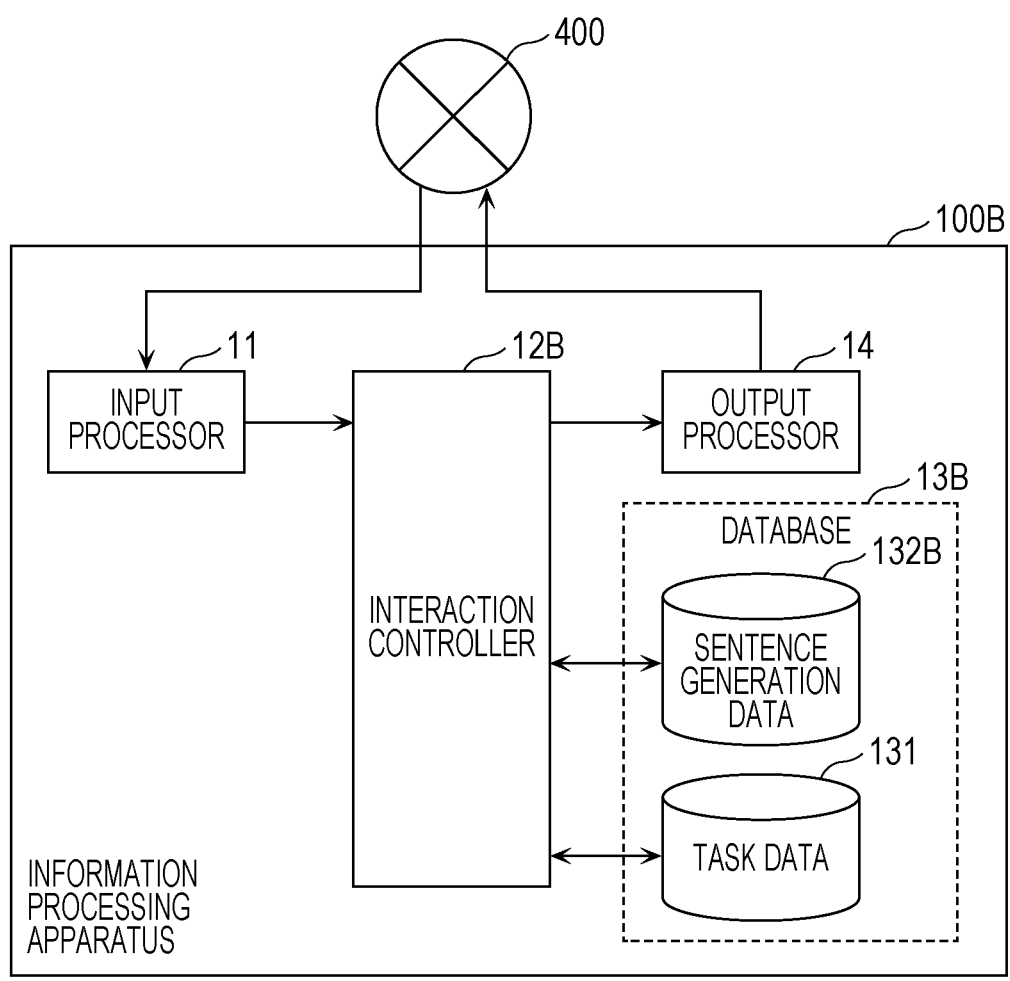
FIG. 20 is a block diagram illustrating an example configuration of an information processing apparatus according to a third embodiment.

FIG. 20 is a block diagram illustrating an example configuration of an information processing apparatus 100B according to the third embodiment. The information processing apparatus 100B according to the third embodiment is different from the information processing apparatus 100 according to the first embodiment in the configurations of an interaction controller 12B and a database 13B.

Interaction Controller 12B

The interaction controller 12B has a function of deciding on an output sentence, which is a question or answer to the user, by using an understanding result output from the input processor 11 and the database 13B. The interaction controller 12B also has, in addition to the function of deciding on an output sentence, a function of managing the number of candidates for information desired by a user, that is, information that the user desires to search for, and managing information to be presented as an example of a user's response to the output sentence that has been decided on.

In the third embodiment, if an answer to a second-type question obtained by the input processor 11 is not a response to the question but is a request for an explanation about a word or phrase included in the question, the interaction controller 12B causes the output processor 14 to output an explanation sentence including another word or phrase related to the word or phrase included in the question and then causes the output processor 14 to output the question again. That is, if a user's answer obtained by the input processor 11 is not a positive or negative answer to a closed question but is a user's question to the closed question, the interaction controller 12B causes the output processor 14 to output an answer to the user's question.

Database 13B

In the third embodiment, the database 13B includes the task data 131 and sentence generation data 132E that is referred to for generating a sentence as illustrated in FIG. 20.

The sentence generation data 132B stores templates of questions for acquiring knowledge and templates to be used for answers to user's questions, in addition to templates of open questions and templates of closed questions that are referred to by the interaction controller 12B.

Process in Information Processing Apparatus 100B

Next, a process performed in the information processing apparatus 100B having the above-described configuration will be described.

Figure 21:
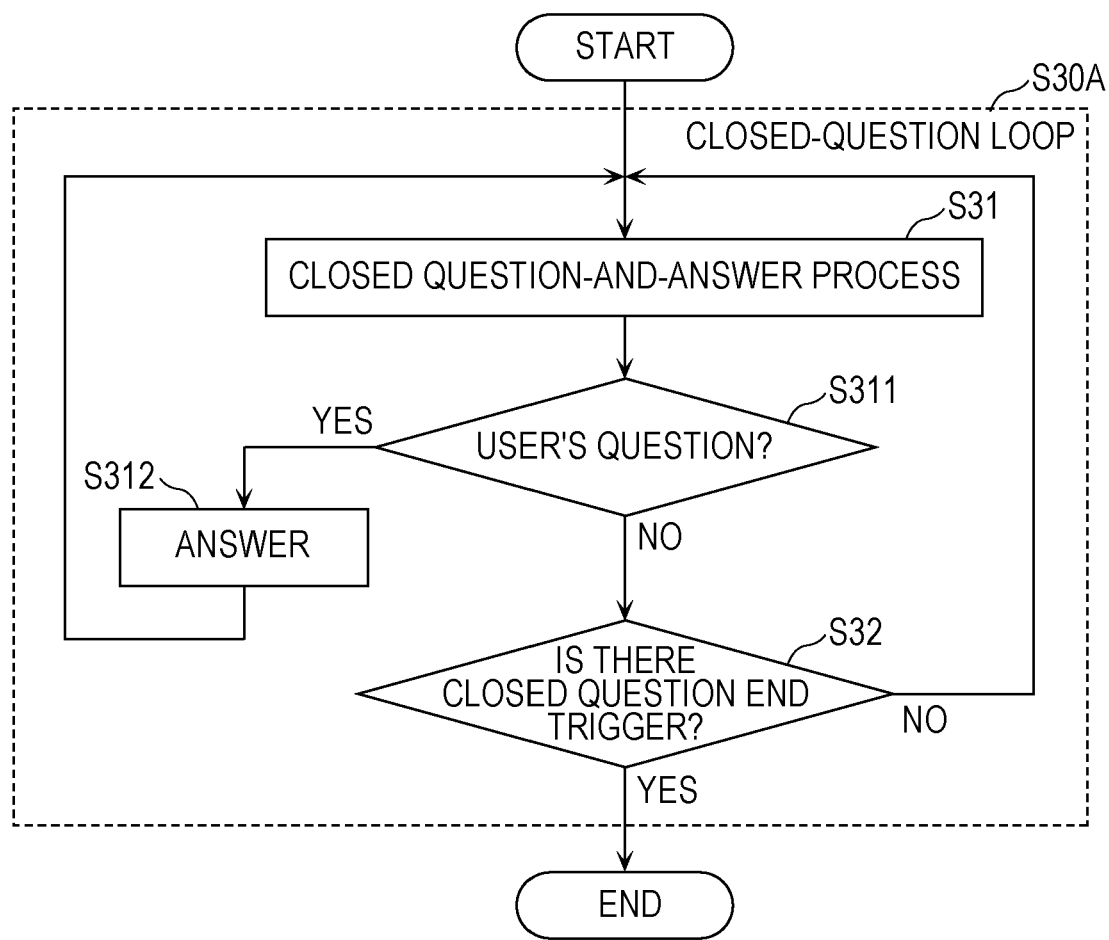
FIG. 21 is a flowchart illustrating an example of the details of a closed-question loop according to the third embodiment.

FIG. 21 is a flowchart illustrating an example of the details of a closed-question loop according to the third embodiment. The same steps as those in FIG. 5 are denoted by the same reference signs, and the detailed description thereof will be omitted.

In the process of the closed-question loop (step S30A) illustrated in FIG. 21, the information processing apparatus 100B first performs a closed question-and-answer process of outputting a closed question about a target of search and obtaining and understanding a user's answer to the question in step S31. Since the question output in step S31 is a closed question, the content of an answer is specified in the question. However, there is a possibility that the user does not know an expression such as a word or phrase included in the closed question. That is, as a user's answer to the closed question, a positive or negative answer such as "Yes" or "No" is expected, but if the user does not know an expression such as a word or phrase included in the question, the user may output, as an answer, a question about the expression such as a word or phrase included in the question.

Subsequently, in step S311, the information processing apparatus 100B determines whether or not an answer to the question output in step S31 is a user's question. If it is determined that the answer is a user's question (YES in step S311), the process proceeds to step S312. Otherwise (NO in step S311), the process proceeds to step S32.

In step S312, the information processing apparatus 100B outputs an answer prepared with reference to the task data 131 and the sentence generation data 132B. Subsequently, in step S31, the information processing apparatus 100B outputs a closed question again.

If the user responds in the form of a question to the closed question output in step S31, the initiative of interaction moves from the system to the user, but the initiative returns to the system after an answer is given in step S312 and then the next question is output in step S31.

In this way, the information processing apparatus 100B is capable of consistently performing system-led interaction control.

Hereinafter, an example of the case of outputting an answer in response to a user's question will be described as Example.

Example

In Example, a description will be given of the case of performing, as a task of performing narrowing down regarding information that a user desires to search for, a task of performing narrowing down to find one or more recipes satisfying a plurality of conditions. That is, a description will be given of a case where a target of search is a plurality of cooking recipes or menus, an open question as a first-type question is a question asking a condition for narrowing down the plurality of cooking recipes or menus, and a closed question as a second-type question is a question asking whether or not to request one of conditions for narrowing down the plurality of cooking recipes or menus. The same points as those in Example 2 of the first embodiment will not be described.

FIG. 22A is a diagram illustrating an example of the task data 131 according to Example of the third embodiment. The same points as those described above with reference to FIG. 8A will not be described.

In FIG. 22A, an oval region R2 depicted with a dotted line is illustrated in addition to the digraph illustrated in FIG. 8A. The region R2 is an example of knowledge used in step S312 for an answer to a user's question if the user does not have knowledge about "root vegetables". For simplicity, the region R2 is separated from the other part that is used for search.

FIG. 22B is a diagram illustrating an example of the sentence generation data 132B according to Example of the third embodiment. FIG. 22B illustrates an example of templates of answers referred to by the interaction controller 12B, in addition to the example illustrated in FIG. 17B. Here, "list_up ("Y")" in FIG. 22B means that, if a plurality of pieces of knowledge ["Y" IsA "X"] as conditions are found regarding "X", the items corresponding to "Y" are listed and connected by using commas. If the number of items is large, only an appropriate number of items may be listed. In Example, an answer output in step S312 varies according to the related task data 131. For example, an answer "For example, Y1 or Y2" or an answer "For example, a kind of Z" is generated and output.

Figure 23:
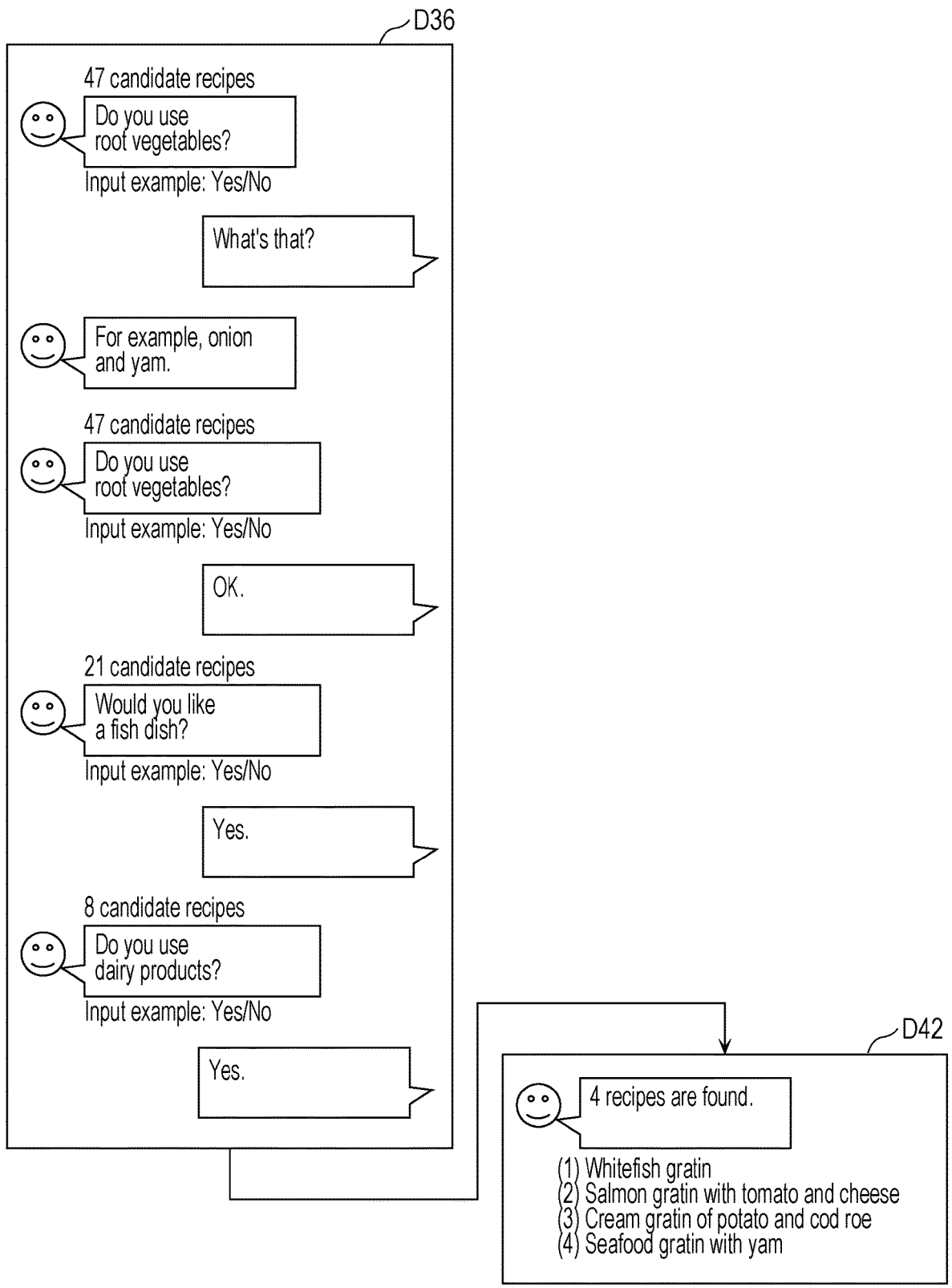
FIG. 23 is a diagram illustrating an example of a display screen according to Example of the third embodiment.

FIG. 23 is a diagram illustrating an example of a display screen D36 according to Example of the third embodiment. The display screen D36 shows an example of interaction in the process of the closed-question loop in step S30A. Hereinafter, a description will be given in accordance with the process illustrated in FIG. 21. The display screen D36 corresponds to the display screen D32 illustrated in FIG. 9 described in Example 2 of the first embodiment, and the same points as those described above using the display screen D32 will not be described here.

As shown in the display screen D36, when it is assumed that a keyword "root vegetables" and an applied relation sign "HasA" are given in step S31, the information processing apparatus 100B outputs "Do you use root vegetables?" with reference to FIG. 22B and the user answers "What's that?". The information processing apparatus 1468 understands that the user's answer is a WHAT-type open question about "root vegetables".

Subsequently, the information processing apparatus 100B determines in step S311 that the user's answer is a user's question (YES in step S311) and the process proceeds to step S312.

Subsequently, in step S312, the information processing apparatus 100B prepares an answer with reference to the knowledge in the region R2 illustrated in FIG. 22A. In Example, the information processing apparatus 100B refers to the pieces of knowledge ["onion" IsA "root vegetable"] and ["yam" IsA "root vegetable"] and generates an answer sentence "For example, onion and yam" by using the template included in the sentence generation data 132B illustrated in in FIG. 22B. Subsequently, the information processing apparatus 100B outputs the answer sentence and then returns to step S31 without obtaining an answer from the user.

Subsequently, in step S31, the information processing apparatus 100B outputs the same closed question "Do you use root vegetables?" because there is no change in the keyword obtained from the user. Then, the user gives a positive answer "OK". The information processing apparatus 100B extracts a keyword "root vegetables" from the user's answer and understands that the extracted keyword "root vegetables" is a positive keyword. The information processing apparatus 100B narrows down the candidates of recipe information to 21 candidates by using the extracted keyword "root vegetables".

The process performed thereafter is the same as in the display screen D32 illustrated in FIG. 9 and thus the description thereof is omitted.

Advantages

The information processing apparatus and so forth of the third embodiment are capable of continuing interaction without causing collapse of the interaction even if a user's answer to a closed question is not an expected positive or negative answer but is a user's question about an expression such as a word or phrase included in the closed question. Accordingly, conditions about information that the user desires to search for can be sufficiently obtained.

Furthermore, the information processing apparatus and so forth of the third embodiment is capable of, even if the user asks a question about an expression such as a word or phrase included in the closed question and if the user takes the initiative in interaction, retaking the initiative by appropriately answering to the question. Accordingly, robust system-led interaction control can be performed.

As described above, the information processing apparatus and so forth of the third embodiment are capable of sufficiently obtaining conditions about information that the user desires to search for, and thus candidates for a target that the user desires to search for can be reliably narrowed down and presented.

As a result, the information processing apparatus and so forth of the third embodiment are capable of implementing interaction control and realizing user satisfaction through task achievement.

The information processing method, the information processing apparatus, and so forth according to embodiments have been described above. The present disclosure is not limited to these embodiments.

The individual processors included in the information processing apparatuses according to the above embodiments are typically implemented as a large scale integration (LSI), which is an integrated circuit. These processors may be mounted on individual chips, or some or all of the processors may be mounted on a single chip.

The integrated circuit is not limited to the LSI, and may be implemented by using a dedicated circuit or a general-purpose processor. Alternatively, a field programmable gate array (FPGA) that is programmable after manufacturing the LSI or a reconfigurable processor that is capable of reconfiguring connections or settings of circuit cells in the LSI may be used.

The present disclosure may be implemented as an information processing method executed by an information processing apparatus.

In the above-described embodiments, each element may be formed of dedicated hardware or may be implemented by executing a software program suitable for the element. In addition, each element may be implemented when a program executing unit such as a CPU or processor reads and executes a software program recorded on a recording medium such as a hard disk or a semiconductor memory.

The functional blocks in the block diagrams are merely an example. A plurality of functional blocks may be combined into a single functional block, a single functional block may be divided into a plurality of functional blocks, or some functions of a functional block may be moved to another functional block. In addition, the functions of a plurality of functional blocks having similar functions may be executed by a single hardware or software unit in parallel or in a time division manner.

The order in which the individual steps in each flowchart are performed is merely an example that is given to describe the present disclosure in detail, and the order may be changed. In addition, one of the above-described steps may be performed at the same time as (in parallel with) another step.

The information processing apparatus and so forth according to one or a plurality of aspects have been described based on the embodiments, but the present disclosure is not limited to the embodiments. Various modifications of the embodiments conceived by a person skilled in the art or a combination of elements in difference embodiments may be included in the scope of one or a plurality of aspects without deviating from the gist of the present disclosure.

The present disclosure can be applied to an information processing method, an information processing apparatus, and a non-transitory recording medium that perform system-led interaction control for controlling an open-question loop and a closed-question loop, and can be used for an information processing method, an information processing apparatus, and a non-transitory recording medium that provide, for example, disease information, recipe information, travel information, real estate information, and so forth, through interaction with a user.

What is claimed is:

1. An information processing method for performing, through interaction with a user, narrowing down regarding information that the user desires to search for, the information processing method being executed by a computer and comprising:

causing an output processor to output a series of questions, wherein the entirety of the series of questions includes a first plurality of questions and a second plurality of questions, the first plurality of questions including a first question, which is a first-type question, about a target of search, the first-type question being an open question;

causing an input processor to obtain a first answer to the first question, the first answer being input by the user;

if a determination is made indicating that the first answer does not satisfy a first condition and that, based on a database storing information about the target of search, a word or phrase corresponding to a word or phrase included in the first answer is not included in the database, causing the output processor to output a second question, which is the first-type question, for requesting an explanation about the word or phrase included in the first answer and not included in the database;

if a determination is made indicating that the first answer does not satisfy the first condition and that, based on the database, the word or phrase corresponding to the word or phrase included in the first answer is included in the database, causing the output processor to output a third question, which is the first-type question, about the target of search; and if a determination is made indicating that the first answer satisfies the first condition, causing the output processor to output the second plurality of questions, the second plurality of questions including a fourth question, which is a second-type question, about the target of search, the second-type question being a closed question for the narrowing down of one or more candidates as the target of search, wherein the first plurality of questions is an ordered combination of a plurality of open-questions and the second plurality of questions is an ordered combination of a plurality of closed-questions, and the first plurality of questions only precedes the second plurality of questions and the second plurality of questions only follows the first plurality of questions.

2. The information processing method according to claim 1, wherein the first condition is determined to be satisfied if the first answer to the first question includes a word or phrase including a negative expression.

3. The information processing method according to claim 1, wherein the output processor is caused to output the first-type question in a form of voice or text.

4. The information processing method according to claim 1, wherein the explanation about the word or phrase included in the first answer and not included in the database is one of specific examples of the target of search.

5. The information processing method according to claim 1, further comprising:

registering, in the database, information that is based on a second answer to the second question, the second answer being input by the user and obtained by the input processor.

6. The information processing method according to claim 1, further comprising:

causing the input processor to obtain a third answer to the fourth question, the third answer being input by the user; and if the third answer is not an answer to the fourth question and is a request for an explanation about a first word or phrase included in the fourth question, causing the output processor to output an explanation sentence including a word or phrase related to the first word or phrase included in the fourth question and then causing the output processor to output the fourth question again.

7. The information processing method according to claim 1, further comprising:

if a determination is made indicating that a state of progress in the narrowing down that has been performed by using a third answer to the fourth question satisfies a second condition, the third answer being input by the user and obtained by the input processor, causing the output processor to output information representing one or more candidates as the target of search, the one or more candidates being obtained through the narrowing down.

8. The information processing method according to claim 7, wherein the second condition is that a total number of candidates as the target of search is equal to or smaller than a predetermined value.

9. The information processing method according to claim 1, wherein the target of search is a medical condition of a patient,
the first-type question is a question asking a symptom noticed by the user, and
the second-type question is a question asking whether or not the user has one of a plurality of symptoms specifying the medical condition.

10. The information processing method according to claim 1, wherein the target of search is a plurality of cooking recipes or menus,
the first-type question is a question asking a condition for narrowing down the plurality of cooking recipes or menus, and
the second-type question is a question asking whether or not to request one of conditions for narrowing down the plurality of cooking recipes or menus.

11. The information processing method according to claim 10, wherein in the database, a plurality of cooking recipes, category information representing categories of the plurality of cooking recipes, and ingredient information representing ingredients used in the plurality of cooking recipes are associated with each other.

12. The information processing method according to claim 1, wherein the target of search is a plurality of travel plans,
the first-type question is a question asking a condition for narrowing down the plurality of travel plans, and
the second-type question is a question asking whether or not to request one of conditions for narrowing down the plurality of travel plans.

13. The information processing method according to claim 1, wherein the target of search is a plurality of real estate properties,
the first-type question is a question asking a condition for narrowing down the plurality of real estate properties, and
the second-type question is a question asking whether or not to request one of conditions for narrowing down the plurality of real estate properties.

14. The information processing method according to claim 1, wherein
the target of search is a plurality of video content items,
the first-type question is a question asking a condition for narrowing down the plurality of video content items, and
the second-type question is a question asking whether or not to request one of conditions for narrowing down the plurality of video content items.

15. The information processing method according to claim 1, wherein
an open-question end trigger ends the open-question loop, the open-question end trigger occurring upon satisfaction of the first condition.

16. An information processing apparatus that performs, through interaction with a user, narrowing down regarding information that the user desires to search for, comprising:
an output processor;
an input processor; and
an interaction controller that controls the output processor and the input processor, wherein
the interaction controller causes the output processor to output a series of questions, wherein the entirety of the series of questions includes a first plurality of questions and a second plurality of questions, the first plurality of questions including a first question, which is a first-type question, about a target of search, the first-type question being an open question,
the interaction controller causes the input processor to obtain a first answer to the first question, the first answer being input by the user;
if the interaction controller determines that the first answer does not satisfy a first condition and that, based on a database storing information about the target of search, a word or phrase corresponding to a word or phrase included in the first answer is not included in the database, the interaction controller causes the output processor to output a second question, which is the first-type question, for requesting an explanation about the word or phrase included in the first answer and not included in the database,
if the interaction controller determines that the first answer does not satisfy the first condition and that, based on the database, the word or phrase corresponding to the word or phrase included in the first answer is included in the database, the interaction controller causes the output processor to output a third question, which is the first-type question, about the target of search, and
if the interaction controller determines that the first answer satisfies the first condition, the interaction controller causes the output processor to output the second plurality of questions, the second plurality of questions including a fourth question, which is a second-type question, about the target of search, the second-type question being a closed question for the narrowing down of one or more candidates as the target of search, wherein
the first plurality of questions is an ordered combination of a plurality of open-questions and the second plurality of questions is an ordered combination of a plurality of closed-questions, and
the first plurality of questions only precedes the second plurality of questions and the second plurality of questions only follows the first plurality of questions.

17. The information processing apparatus according to claim 16, wherein
an open-question end trigger ends the open-question loop, the open-question end trigger occurring upon satisfaction of the first condition.

18. A non-transitory recording medium storing a program that causes a computer to execute an information processing method for performing, through interaction with a user, narrowing down regarding information that the user desires to search for, the information processing method comprising:
causing an output processor to output a series of questions, wherein the entirety of the series of questions includes a first plurality of questions and a second plurality of questions, the first plurality of questions including a first question, which is a first-type question, about a target of search, the first-type question being an open question;
causing an input processor to obtain a first answer to the first question, the first answer being input by the user;
if a determination is made indicating that the first answer does not satisfy a first condition and that, based on a database storing information about the target of search, a word or phrase corresponding to a word or phrase included in the first answer is not included in the database, causing the output processor to output a second question, which is the first-type question, for requesting an explanation about the word or phrase included in the first answer and not included in the database;
if a determination is made indicating that the first answer does not satisfy the first condition and that, based on the database, the word or phrase corresponding to the word or phrase included in the first answer is included in the database, causing the output processor to output a third question, which is the first-type question, about the target of search; and
if a determination is made indicating that the first answer satisfies the first condition, causing the output processor to output the second plurality of questions, the second plurality of questions including a fourth question, which is a second-type question, about the target of search, the second-type question being a closed question for the narrowing down of one or more candidates as the target of search, wherein
the first plurality of questions is an ordered combination of a plurality of open-questions and the second plurality of questions is an ordered combination of a plurality of closed-questions, and
the first plurality of questions only precedes the second plurality of questions and the second plurality of questions only follows the first plurality of questions.

19. The non-transitory recording medium according to claim 18, wherein
an open-question end trigger ends the open-question loop, the open-question end trigger occurring upon satisfaction of the first condition.

* * * * *